Jan. 4, 1966    M. O. RUDD ETAL    3,226,887
METHOD AND APPARATUS FOR PROCESSING OF OPHTHALMIC LENS
Filed March 7, 1962    8 Sheets-Sheet 2

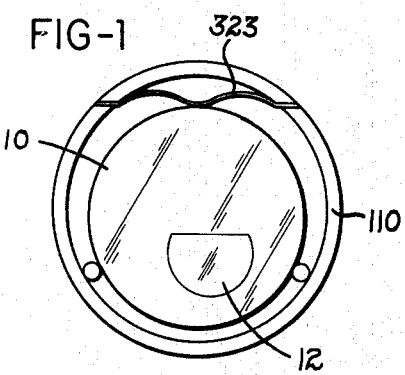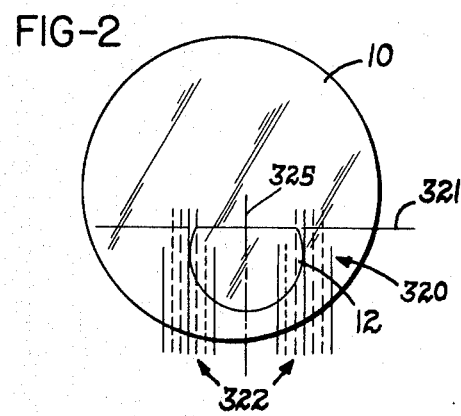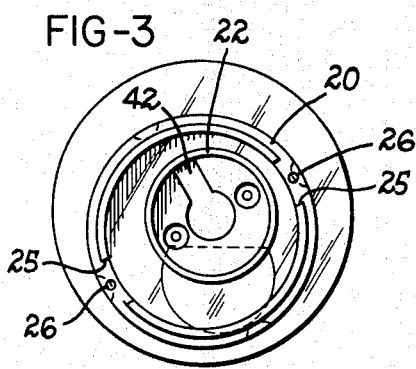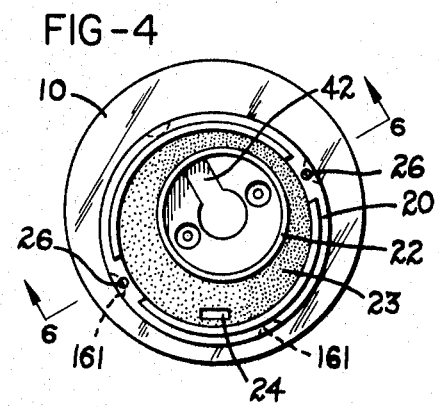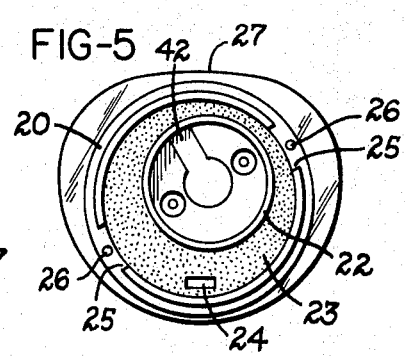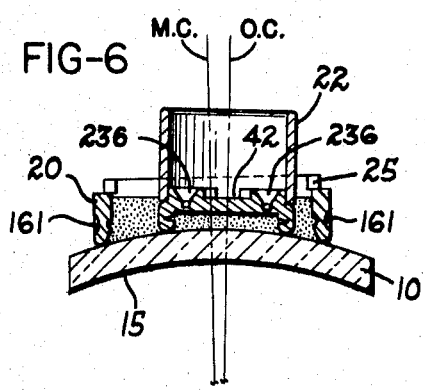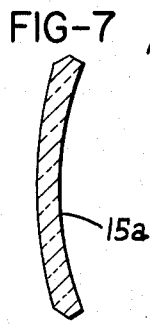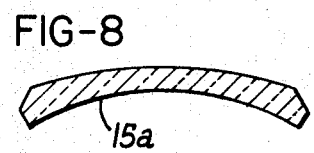

INVENTORS
MILO O. RUDD,
WALTER C. TRIPP &
BY  GEORGE A. BEASLEY

Mareschal, Biebel, French & Bugg
ATTORNEYS

Jan. 4, 1966 M. O. RUDD ETAL 3,226,887
METHOD AND APPARATUS FOR PROCESSING OF OPHTHALMIC LENS
Filed March 7, 1962 8 Sheets-Sheet 3
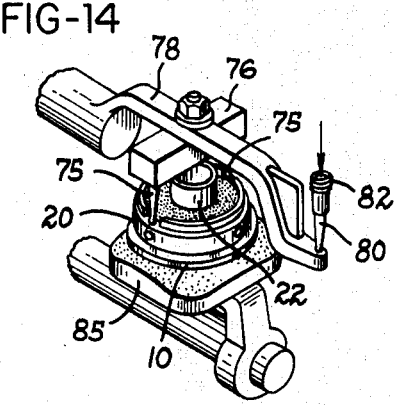
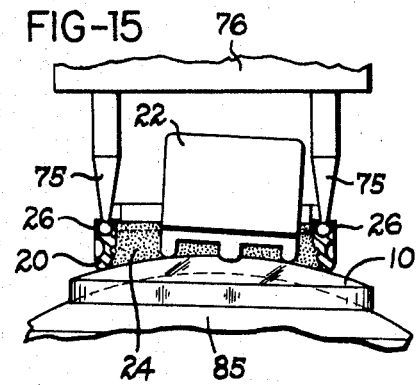
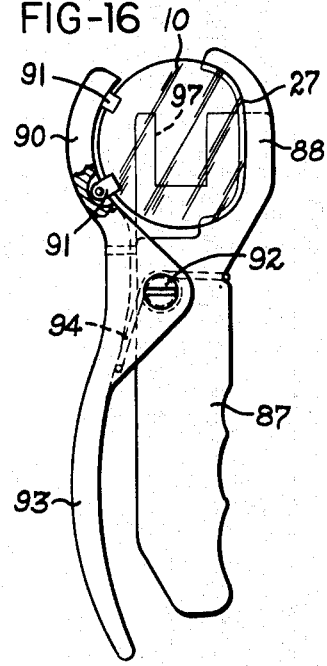
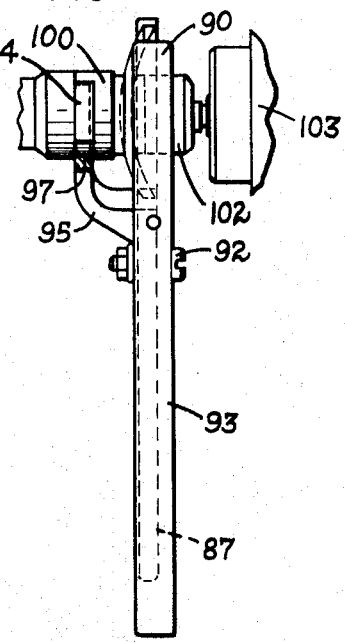
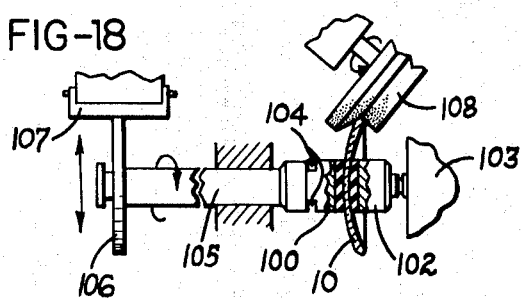
INVENTORS
MILO O. RUDD,
BY WALTER C. TRIPP &
GEORGE A. BEASLEY
*Marshal, Biebel, French & Bugg*
ATTORNEYS

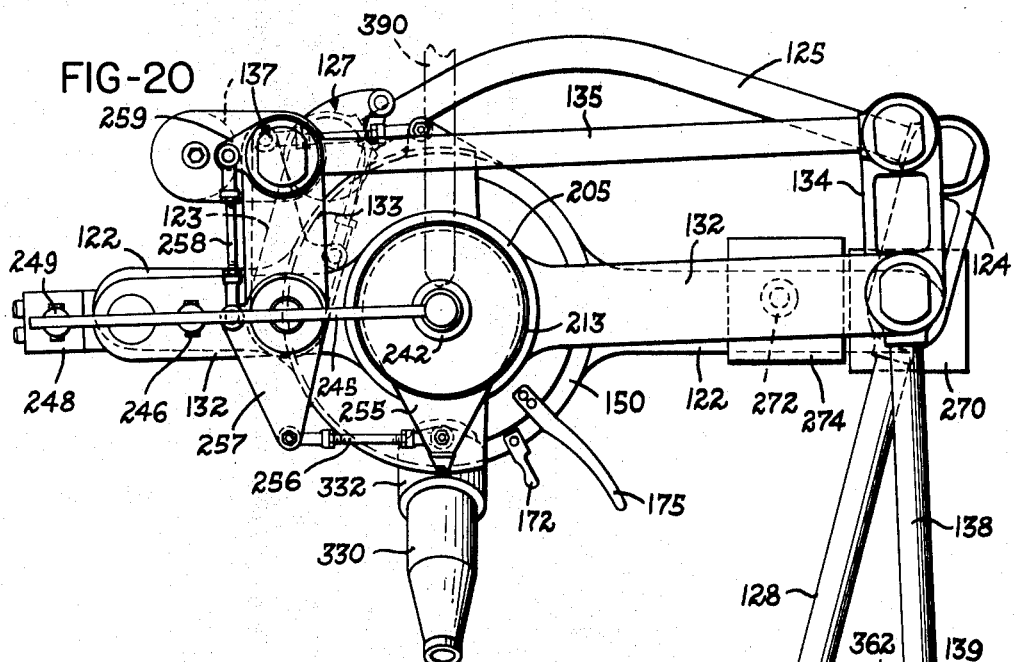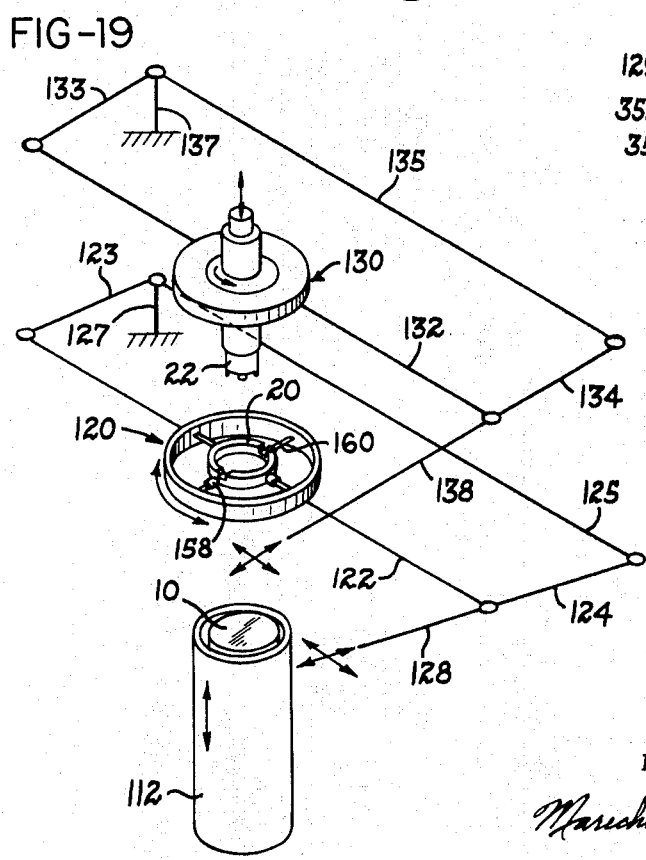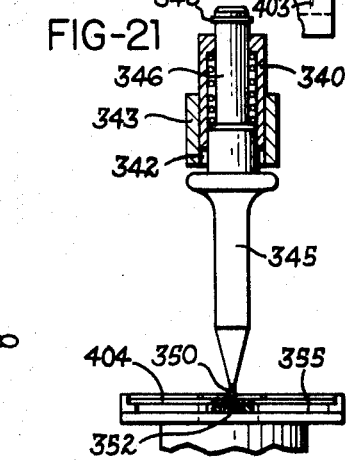

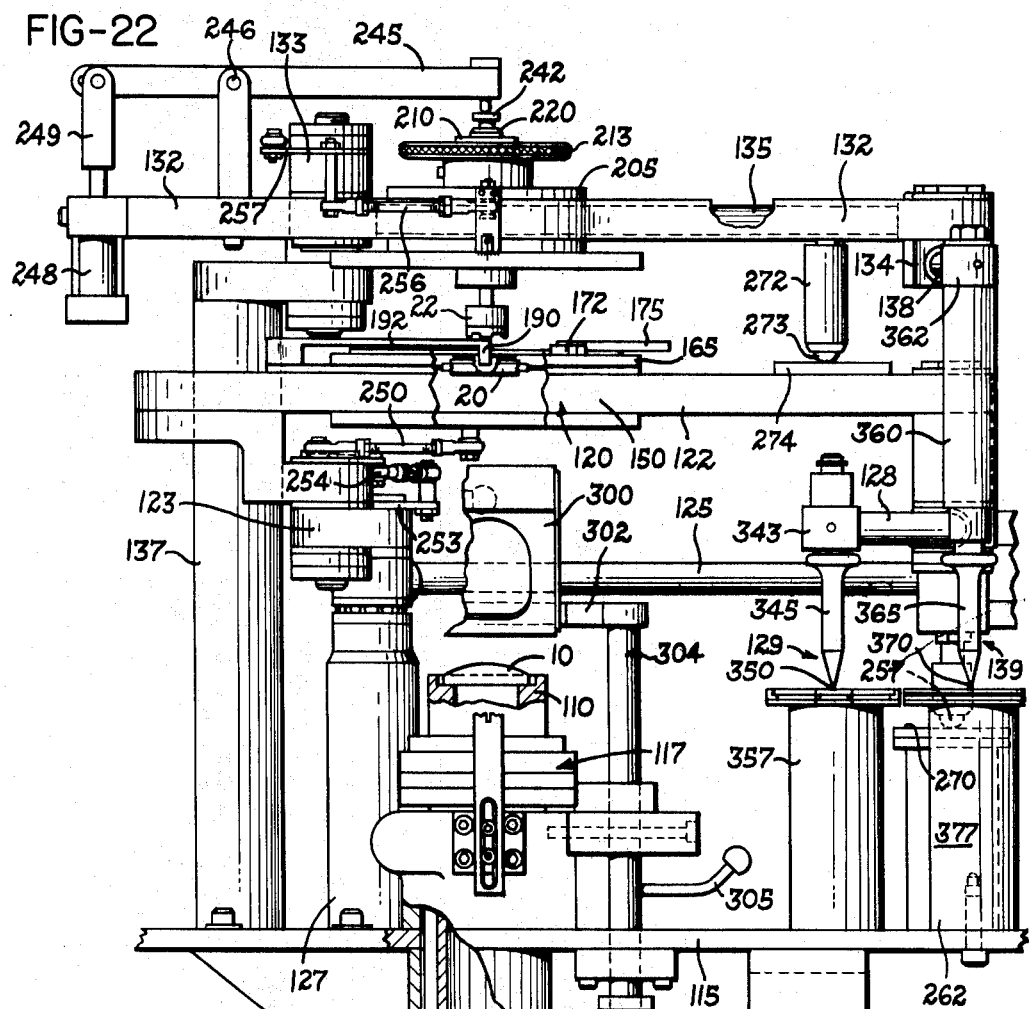
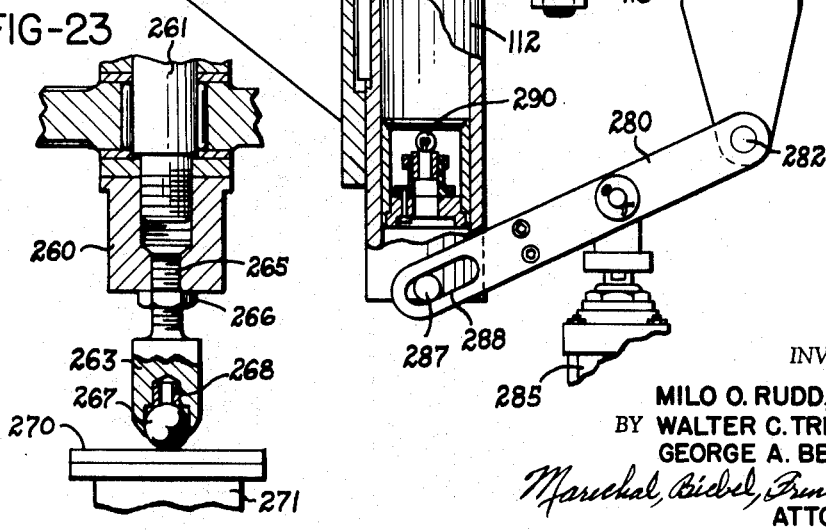

Jan. 4, 1966 M. O. RUDD ETAL 3,226,887
METHOD AND APPARATUS FOR PROCESSING OF OPHTHALMIC LENS
Filed March 7, 1962 8 Sheets-Sheet 6
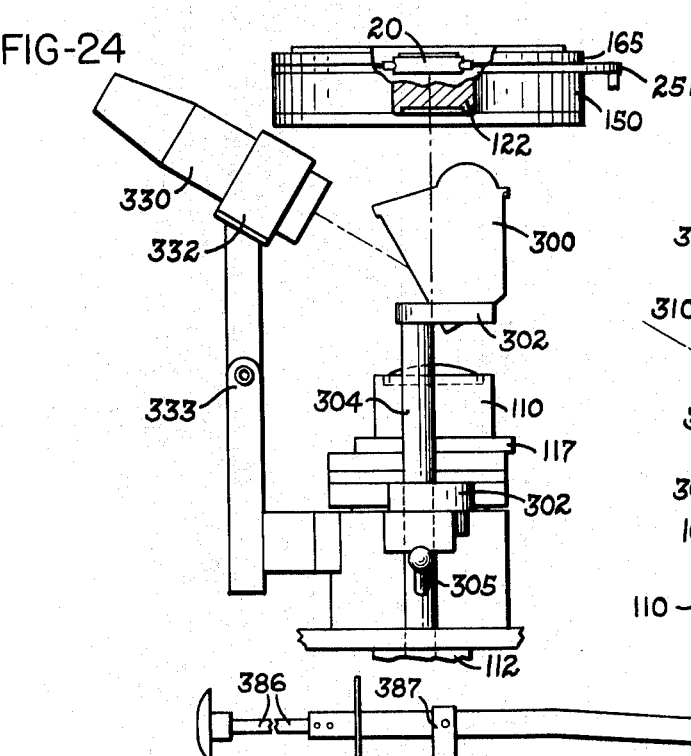
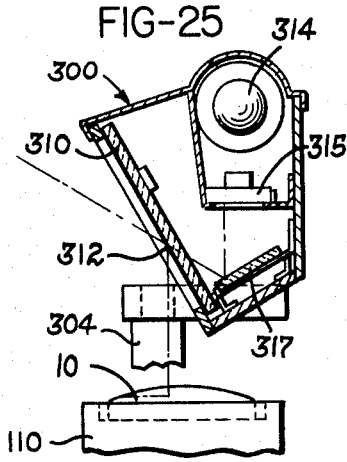
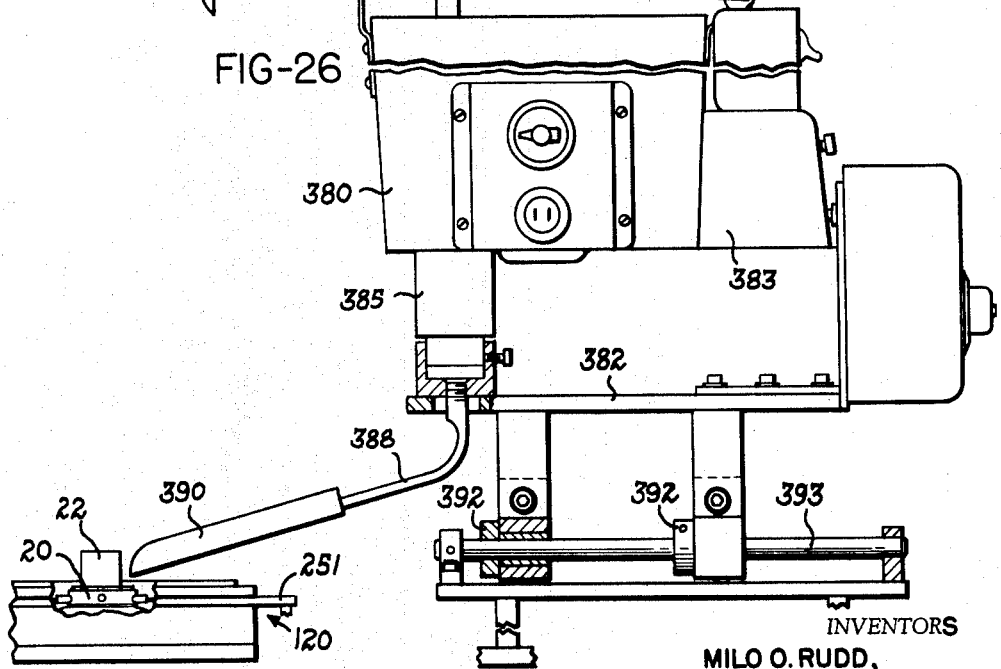
INVENTORS
MILO O. RUDD,
BY WALTER C. TRIPP &
GEORGE A. BEASLEY
ATTORNEYS

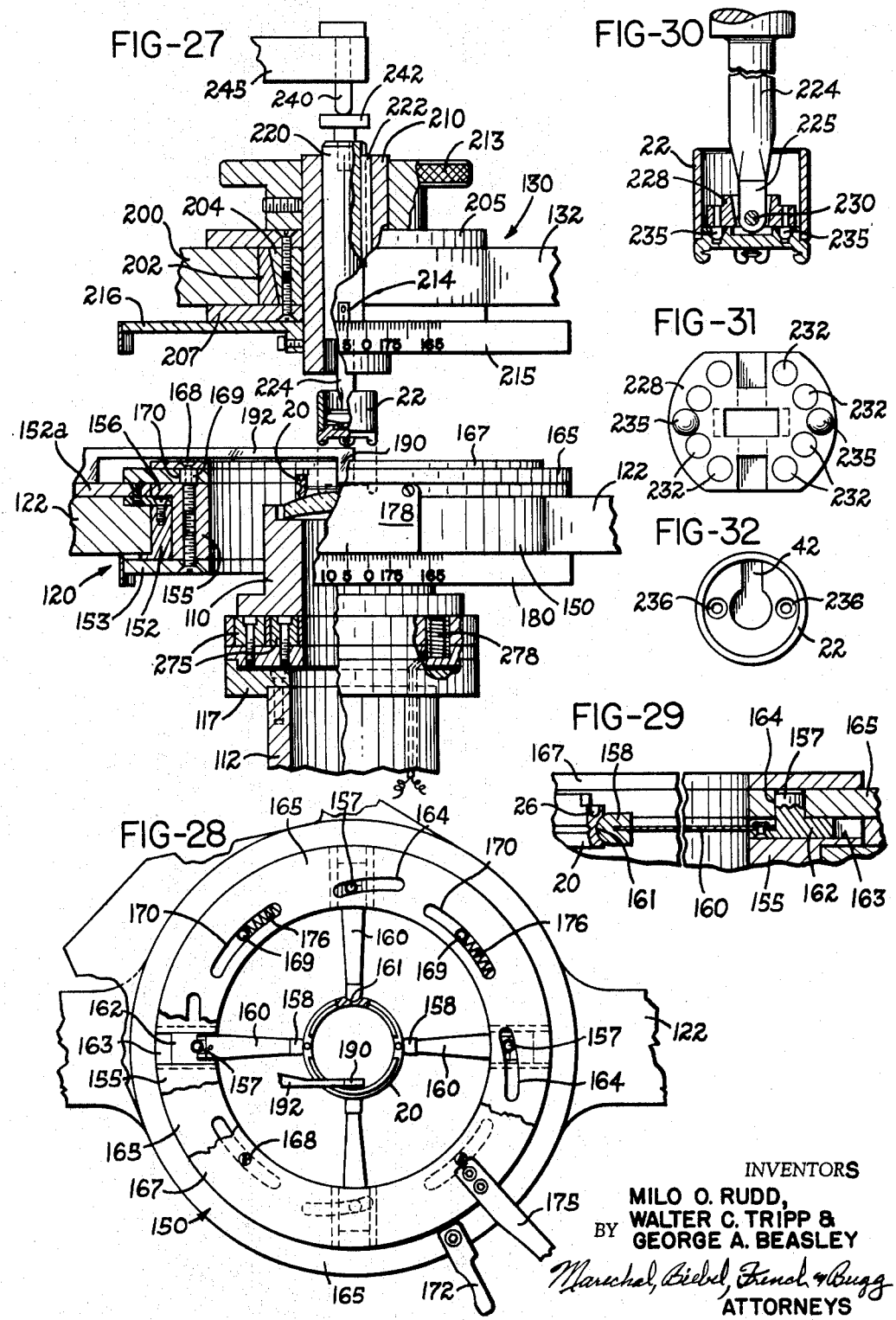

Jan. 4, 1966    M. O. RUDD ETAL    3,226,887
METHOD AND APPARATUS FOR PROCESSING OF OPHTHALMIC LENS
Filed March 7, 1962    8 Sheets-Sheet 8
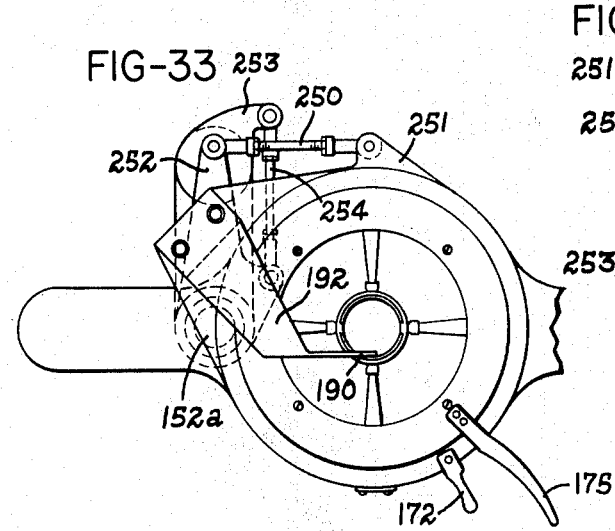
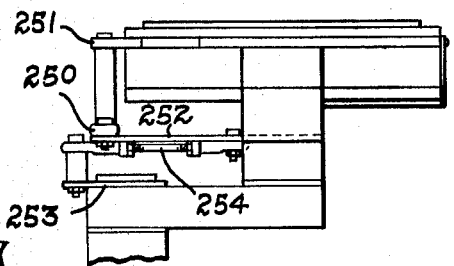
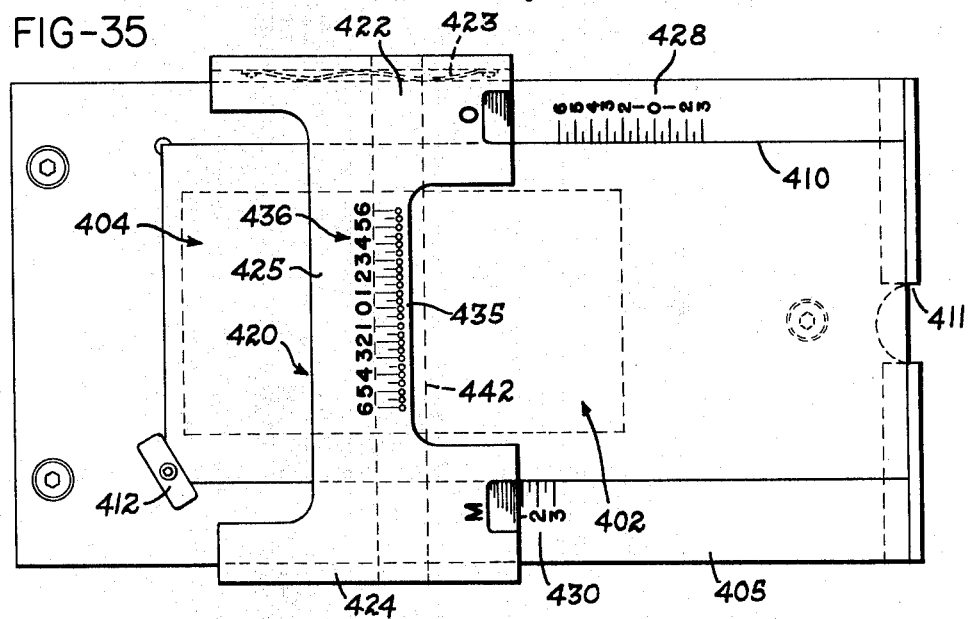
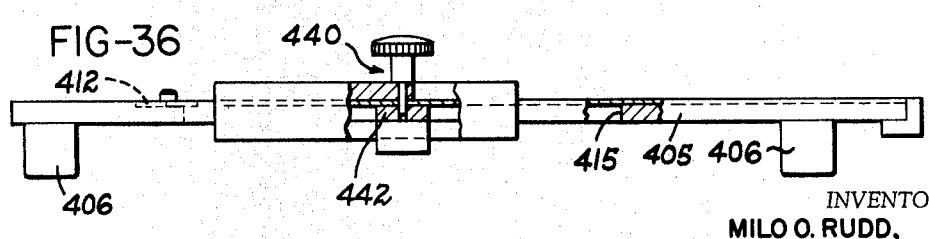
INVENTORS
MILO O. RUDD,
BY WALTER C. TRIPP &
GEORGE A. BEASLEY
Marechal, Biebel, French & Bugg
ATTORNEYS

United States Patent Office

3,226,887
Patented Jan. 4, 1966

3,226,887
METHOD AND APPARATUS FOR PROCESSING OF OPHTHALMIC LENS
Milo O. Rudd, Walter C. Tripp, and George A. Beasley, all of Fort Lauderdale, Fla., assignors to Univis, Inc., Fort Lauderdale, Fla., a corporation of Ohio
Filed Mar. 7, 1962, Ser. No. 178,118
24 Claims. (Cl. 51—277)

The present invention relates to a process and to apparatus for manufacturing ophthalmic lenses to order, i.e., to prescription according to the needs of the eventual wearer or user of the lenses.

The present methods and apparatus for finishing ophthalmic lenses require the services of skilled technicians who laboriously determine the manner in which a semi-finished lens blank is gripped and ground, lapped, edged, etc., to produce the required lens surface properly oriented when mounted in spectacle frames on the wearer. Considerable time, and expensive labor, is involved in the present method, and there is a relatively high incidence of breakage, which of course means that work done on that lens is lost and must be completely renewed. In general, the optical laboratory purchases semi-finished blanks which are over-size as to area and thickness. One surface, usually the front surface (as mounted, or with respect to the wearer) is finished, and the other side is ground by the laboratory to prescription and the edges of this blank are finished, at which time the finished lens is mounted in the spectacle frame.

There are several factors which must be taken into account by the technician in the optical laboratory in performing the present method which results in the so-called "edged lens," i.e., the finished lens prepared for fitting in the frame. The aforementioned other surface of the blank as a rule is generated as a toric surface, but occasionally as a spherical surface. A toric surface has different curvatures at right angles to each other, and is thus non-spherical. This toric surface is usually cupped in as viewed from the rear, in which case it is known as "minus-toric." The cylinder axis of the lens is the direction of least power of the toric surface, and therefore is a definition of the orientation of the toric surface with respect to the finished edged blank. Cylinder axis is measured from horizontal in a counter-clockwise direction as viewed from the front of the lens, i.e., as viewed by an observer, as distinguished from the wearer.

The finished blank has a so-called "mechanical center" which is the point within the lens from which the edge of the finished lens is referred. This is ordinarily determined by drawing a rectangle about the lens and locating the intersection of the bisectors of the horizontal and vertical sides of such rectangle.

The "optical center" of the lens is that point where it has zero prism. It can generally be described as the point at which a beam of light which strikes the lens will not be bent in passing through. The technician uses a layout chart which serves to locate the point where the optical center should be. In the case of bifocal lenses which will be used hereinafter as an example, this layout chart locates the ultimate optical center of the finished lens on the blank with reference to the bifocal segment.

The prescription furnished to the technician specifies the type of frame and from this he can determine the lens height and width, and the distance between lenses, which is the distance horizontally between the adjacent side edges of the lenses, across the bridge. The prescription will also give the pupillary distance for the wearer. The prescription will also tell, in the case of multifocal lenses, where the top of the reading segment of the lens is located with respect to the bottom of the finished lens.

Working from the prescription, the technician at present, positions the semi-finished blank on a layout chart, determines the desired ultimate location of the optical center, and then marks on the blank the position of this center and cylinder axis line as determined by prescription. He adheres a block to the finished side of the semi-finished lens with a suitable adhesive material, and this block has three holes which are aligned with the cylinder axis, the center hole lying on the optical center. The block is gripped in a collet and the blank swept by a rotating grinding wheel. The diameter of the wheel together with the angle of the wheel with respect to the other side of the blank determines one radius of the toric surface; the other radius of the toric surface is determined by the curve through which the wheel is swept over such other side of the blank. The blank is then ground and polished with standard lapping equipment, using tools precut to correspond with the toric surface generated by the grinder, after which the lens is removed from the block and returned to the technician. It should be noted that all of the grinding and finishing operations have been performed on the entire semi-finished blank.

At this time the technician determines and marks the mechanical center of the blank and also marks a horizontal axis line through the mechanical center of the lens, and the blank is cut and chipped to its ultimate edge form, but left approximately one millimeter over-size. The blank is then mounted into a alignment fixture, by visual alignment based on the marked mechanical center and horizontal axis, and placed in an edging machine which is cam controlled to produce the finished lens of the required size and contour.

It will be apparent from the foregoing, which is but a general description of present methods, that the optical laboratory technician must spend considerable time and effort in measuring, marking and aligning the semi-finished blank, and that the rear surface is completely finished to prescription before the semi-finished blank is cut to its ultimate contour. Considerable time and expensive labor of a skilled technician is required, the grinding and finishing lapping operations are performed over substantially the entire area of the semi-finished blank, the technician spends further time preparing and mounting the blank in the alignment fixture, and then it is possible in the edge cutting operation that the blank may be broken.

Accordingly, the primary purpose of this invention is to provide a novel method and novel apparatus according to which a technician can rapidly determine the ultimate mechanical center and the ultimate optical center of the finished edge lens, secure fixtures to the lens properly aligned with each of these centers and taking into account the required cylinder axis, then the semi-finished blank, for the purposes of reducing grinding and polishing can be reduced in size to a smaller semi-finished blank having its area balanced about the ultimate mechanical center of the lens, after which the prescribed surface, in its more general form a toric surface, is formed on the blank followed by finish edging to produce the finished lens ready for fitting in the frame.

Another object of the invention is to provide a novel method of processing multifocal ophthalmic lenses in which the ultimate mechanical center of the finished lens is determined on the semi-finished lens blank by viewing the multifocal segment of the blank simultaneously with a target which appears coincident in position with the segment, a fixture is secured to the semi-finished blank in predetermined alignment with the ultimate mechanical center of the blank as referenced from the target, including azimuth correction according to the clyinder prescription, a further fixture is secured to the semifinished blank offset from such mechanical center and in predetermined alignment with the ultimate optical center of the finished lens, and these fixtures are employed as alignment and holding devices for the blank during generating, lapping, and preliminary edging operations.

Another object of the invention is to provide novel apparatus which mounts a semi-finished lens blank, projects a target suitable for referencing the multifocal segment of the blank, provides for alignment of the blank with respect to the target, and also provides for precise location of fixtures on the blank with respect to the mechanical center and the optical center respectively as determined by visual comparison of the target and the blank, and including means for relative rotation between the fixtures and the blank to include the prescribed cylinder axis in the positioning of the fixtures on the lens blank, such that generating of the prescribed optical surface on the blank can be accomplished with reference to the ultimate optical center and edging of the blank to its finished form can be accomplished with reference to the ultimate mechanical center.

A further object of the invention is to provide novel apparatus by means of which fixtures in the form of hubs are mounted on the finished surface of a semi-finished lens blank, one hub being aligned with the ultimate optical center of the finished lens and the other hub being aligned with the ultimate mechanical center of the finished lens, all in a continuous operation and under the control of a single unskilled operator, whereby a finished lens can be produced by simple mechanical operations performed on the lens blank with the fixture hubs attached and used for alignment purposes in such subsequent mechanical operations.

Another object of the invention is to provide novel apparatus for affixing to a semi-finished lens blank index or reference means which are aligned with, respectively, the ultimate mechanical center of the finished lens as it is located on the blank, the ultimate optical center of the finished lens as it is located on the blank, and with a horizontal line across the finished lens in mounted position as such line is located on the blank.

An additional object of the invention is to provide novel apparatus for applying to a semi-finished lens blank several index or reference fixtures, the locations of which are determined by the prescription for the desired lens to be formed from the blank, and by translating the requirements of such prescription into suitable indicia formed on a card or its equivalent, such card and such indicia being utilized in the apparatus to locate the various fixtures on the semi-finished blank from which the prescribed finished lens is formed.

A further object of the invention is to provide a novel method of processing ophthalmic lenses according to prescription, wherein the prescription is translated into predetermined locations of holding and aligning fixtures, such fixtures are thereby properly located on a semi-finished lens blank, and then adhered to the finished surface of such blank, and thereafter the fixtures are utilized by workmen unskilled in the ophthalmic art to generate the prescribed optical surface on the blank and to form a finished lens from the blank with regard to the prescribed location of the optical surface and the contour of the finished lens.

Other objects and advantages of the invention will be apparent from the following description, the accompanying drawings and the appended claims.

In the drawings:

FIG. 1 is a view of a typical semi-finished blank, of the improved multifocal type, which is located in a holder ready to be processed in accordance with the invention to form an ophthalmic lens according to prescription;

FIG. 2 is a view of the semi-finished blank, on a somewhat larger scale, showing the manner in which the alignment target is viewed and the multifocal segment of the blank is located with respect to such target;

FIG. 3 is a view showing the blank of FIG. 2 with fixture rings or hubs mounted thereon, centered on the ultimate optical center and the ultimate mechanical center respectively, of the finished lens;

FIG. 4 is a view similar to FIG. 3, showing the assembly of the semi-finished blank and fixture rings together with an alignment index or cavity referenced to the ultimate horizontal mounting of the finished lens;

FIG. 5 is a view of the assembly of blank and fixtures showing a type of intermediate peripheral contour which may be formed on the blank according to the invention;

FIG. 6 is a sectional view taken along the line 6—6 of FIG. 4;

FIGS. 7 and 8 are sectional views taken at right angles to each other through the center of the finished lens, and illustrating the general arrangement of the toric surface formed on the rear of the lens, as well as a suitable finished edge;

FIG. 14 is a perspective view showing the general manner in which the assembly of the blank and fixture rings is engaged with conventional apparatus for grinding and polishing the generated surface on the blank;

FIG. 15 is an enlarged detail view, partly in section, showing further details of the engagement between the polishing apparatus and that fixture ring centered on the ultimate mechanical center of the finished lens;

FIG. 16 is a plan view, with a portion broken away and shown in section, of an alignment tool receiving the blank subsequent to grinding, polishing, and removal of the fixture rings, for indexing and inserting the blank in a finish edge grinding apparatus;

FIG. 17 is a side view of the tool shown in FIG. 16, also illustrating the manner in which the tool is indexed to the chuck of the edge grinding apparatus;

FIG. 18 is a somewhat schematic view of the finish edge grinding apparatus;

FIG. 19 is a diagrammatic illustration of the overall configuration of novel apparatus provided by the invention for affixing the fixture hubs to the lens blank;

FIG. 20 is a plan view of the major components of the apparatus;

FIG. 21 is an enlarged detail view of a stylus on the apparatus shown in FIG. 20, showing also cooperation of the stylus with an alignment plate and prescription alignment card;

FIG. 22 is a front elevational view of the apparatus, with the operator's viewing piece removed, and with certain parts broken away and shown in section;

FIG. 23 is an enlarged sectional view through one of the movable bearing supports in the apparatus shown in FIG. 22;

FIG. 24 is a side elevational view of the viewing piece, target projecting mechanism, and the lens blank holder of the apparatus, shown in alignment with the mounting ring for the mechanical center fixture hub;

FIG. 25 is an enlarged view, partly in section, illustrating details of the alignment target projector;

FIG. 26 is a partially broken side elevational view of the device for delivering a metered amount of bonding material to the aligned fixture hubs and lens blank for assembling them in the desired alignment;

FIG. 27 is an enlarged view, half in section and half in elevation, showing details of the mounting or holder rings for the two fixture hubs and also showing details of the lens blank holder assembly;

FIG. 28 is a plan view, with certain parts broken away to show interior structure, of the lower holder for the fixture ring to be aligned with the mechanical center of the lens;

FIG. 29 is a detail sectional view on an enlarged scale taken through one of the holder fingers shown in FIG. 28;

FIG. 30 is an enlarged sectional view illustrating the holder for the fixture ring to be aligned with the ultimate optical center of the finished lens;

FIG. 31 is a plan view, on an enlarged scale, looking at the bottom of the fixture ring holder shown in FIG. 30;

FIG. 32 is a plan view, on the same scale as FIG. 30, looking into the interior of the fixture ring;

FIG. 33 is a plan view of the holder ring structure for the mechanical center fixture hub, illustrating particularly the restraining linkage which maintains the preset azimuthal position of the fixture hub during other movements of the apparatus;

FIG. 34 is a side elevational view of the parts shown in FIG. 33, as viewed from the left of that figure.

FIG. 35 is a plan view of a record making apparatus according to the invention, such a record to be used in controlling the apparatus shown in FIGS. 19–30; and FIG. 36 is a side elevational view of the apparatus shown in FIG. 35, with certain parts broken away and shown in section.

Figure 9:
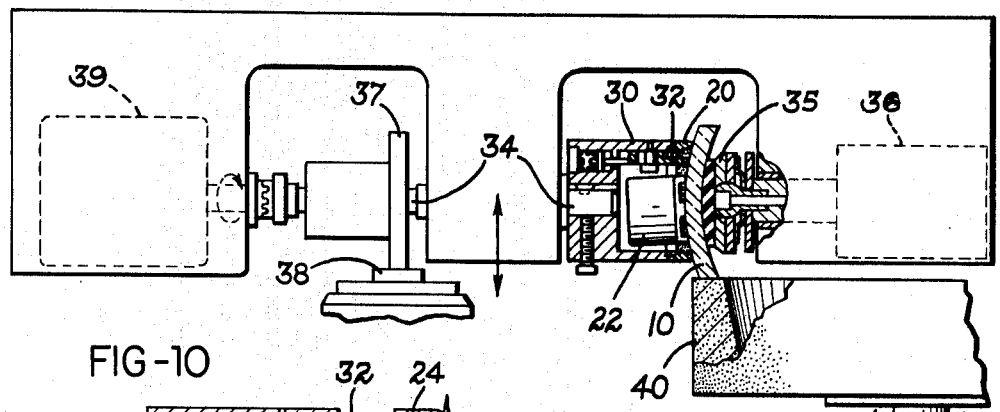
FIG. 9 is a somewhat diagrammatic illustration of contouring apparatus used to form the contour on the blank as shown in FIG. 5.
Figure 10:
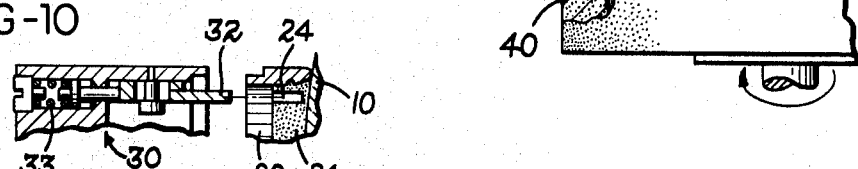
FIG. 10 is a detail sectional view on an enlarged scale, showing the alignment of that fixture ring centered on the ultimate mechanical axis within the apparatus shown in FIG. 9.

Referring to the drawings, which illustrate the steps of the method and a preferred embodiment of novel apparatus for performing certain steps in the method, a typical semi-finished lens blank 10 is shown in FIGS. 1 and 2 in the condition in which it is received from the supplier by the optical laboratory. For purposes of illustration and explanation the blank is shown as a bifocal blank, having a main portion of one index of refraction and a bifocal segment 12 of a different index of refraction. In the blank illustrated the front or outer surface, in other words that surface which would be on the exterior of the finished sepectacles, is finished to a predetermined contour, usually spherical, and the rear surface 15 (FIG. 6) is that upon which the optical laboratory generates the prescribed optical surface in accordance with the necessary optical corrections for the individual eyes of the ultimate wearer of the spectacles. It is possible that this arrangement can be reversed with the multifocal segment on a rear finished surface, and the prescription surface formed on the front, but this is unusual at present.

As explained, this prescription surface 15a (FIGS. 7 and 8) in most case is a toric surface, having one radius of curvature across the lens in one direction (FIG. 7), and a different radius of curvature in a direction at right angles (FIG. 8). These two radii are at right angles to each other, and the amount by which the cylinder axis is titled (with respect to a horizontal line across the finished lens when mounted) is expressed in terms of degrees.

In accordance with the invention the location of the ultimate optical center and of the utlimate mechanical center of the finished lens is determined in relation to an arbitrary reference point, and the multifocal segment of the blank is in turn referenced visually, with respect to the same arbitrary point, and to a horizontal axis reference. When this is done, as will be explained in detail, the technician then secures to the front surface of the blank 10 two separate fixtures in the form of hubs 20 (hereafter called the mechanical center ring or hub) and 22 (hereafter called the optical center ring or hub), which have been aligned azimuthally with respect to such horizontal reference axis according to the prescribed cylinder axis. These fixture hubs or rings are fastened securely, though temporarily, to the front of the semi-finished blank by means of a suitable bonding material 23 (FIG. 4), for example a low melting alloy which is poured in molten state over the front surface of the blank when the hubs are properly positioned thereon. When this sub-assembly is completed, the ring 20 has its axial center line M.C. (FIG. 6) containing the ultimate mechanical center of the finished lens, and the ring 22 has its axial center line O.C. (FIG. 6) containing the ultimate optical center of the finished lens. Also, cavity 24 is formed in the material, having its azimuthal position in fixed relation to the desired horizontal position or axis reference of the mounted finished lens, i.e., with the top of segment 12 horizontal.

For purposes of explaining the novel processing method, details of the alignment and monuting procedure of the fixtures on the semi-finished blank will be discussed further on, and it is assumed at this time that these fixtures are secured to the semi-finished blank in the desired alignment, as just described.

The assembly of blank and fixture is monuted in an edge grinding or contouring apparatus (FIG. 9). It should be noted, in this regard, that ring 20 is provided with indexing slots 25 and with seats or sockets 26 which are in predetermined adjusted alignment with respect to a horizontal line across the blank and the ultimate or finished lens. Therefore, by appropriate rotation of ring 20 with respect to the blank, before it is secured thereto, these sockets are arranged to produce a cylinder axis alignment sa prescribed in a line through the utlimate mechanical center. The contouring apparatus forms an asymmetrical peripheral contour or edge on the blank about the utlimate mechanical center, for example producing an edge portion of different radius 27, as shown in FIG. 5, and therefore this contour, which is only generally related to the ultimate contour of the finished lens, produces in the blank a direct reference or index to the prescribed cylinder correction, whereas the cavity 24 provides an index to the horizontal arrangement of the finished lens, and thus to the reference from which cylinder correction is measured.

The preliminary edge grinding apparatus, which is shown somewhat schematically in FIG. 9, includes an adapter chuck 30 which engages the ring 20. A rectangular pin 32, dimensioned to fit cavity 24 is slidably mounted on the chuck, biased outward by a spring 33. This chuck is mounted on a shaft 34 and the sub-assembly of the blank and attached fixture rings is held in the chuck by means of a clamping plate 35 operated by suitable clamping means, such as air cylinder 36. Also fixed to the shaft 32 is a contour cam 37 having the asymmetrical peripheral contour configuration desired in the blank. This cam engages a plate 38 as shaft 34 is rotated by a suitable motor 39, moving the rotating blank 10 toward and away from the rotating cup-shaped edge grinding wheel 40. Thus, the desired asymmetrical contour is formed on the blank, referenced to the horizontal axis of the finished lens.

Figure 11:
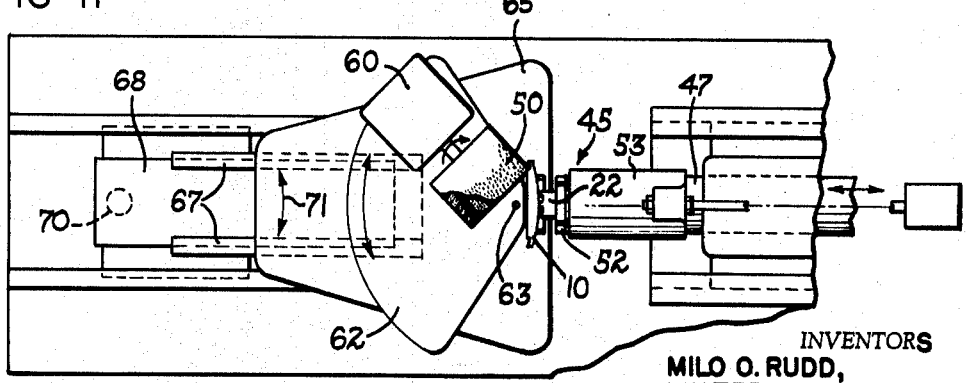
FIG. 11 is a schematic plan view of a typical toric surface generator used in the method of this invention.

Following this contouring operation, during which the blank is shaped to a balanced condition around the ultimate mechanical center and the size of the semi-finished blank is significantly reduced, the assembly is mounted in a conventional generating machine (FIG. 11), using the optical center hub or ring 22 as the mounting and locating means. This hub also is provided with a slot 42 (FIG. 4) inside its base which is related to the prescribed cylinder axis angle. Therefore, when the toric surface is generated by grinding the rear surface 15 of the blank, using hub 22 for mounting and alignment purposes, the toric surface is properly oriented on the blank.

Figure 12:
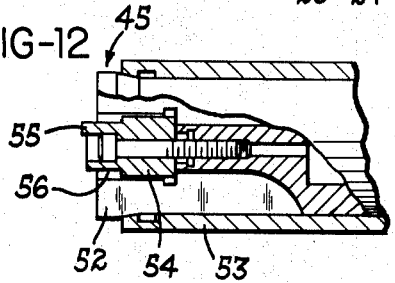
FIG. 12 is an enlarged detail view, partly in section, showing the alignment fixture in the generator chuck for proper orientation of the assembled semi-finished blank and fixture rings in the generator.
Figure 13:
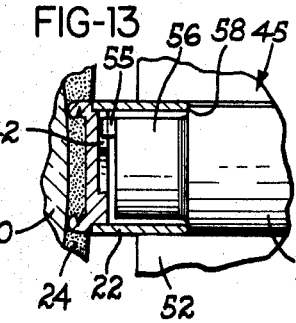
FIG. 13 is a view similar to FIG. 12 showing the manner in which the generator chuck engages that fixture ring centered on the ultimate optical center of the finished lens.

The generating machine includes an adapter chuck 45 as shown in FIGS. 12 and 13, which holds the hub 22 such that the axis of the hub or ring coincides with the axis of the support member 47. The particular type of toric surface generator shown is of a kind obtainable from Coburn Manufacturing Company, of Muskogee, Oklahoma, known as a Model 111 Toric Lens Generator. The chuck 45 is mounted on a support 47 which can move in a line toward and away from the generating grinder wheel 50 which is preferably a cup-shaped wheel. The chuck includes a radially split collet 52 which can be contracted by forward or clamping motion of the surrounding sleeve 53, there being complementary tapered surfaces on the sleeve and collet as shown in FIG. 12. In the interior of the collet there is an alignment member 54 having a forwardly projecting lug 55 which is arranged to project into the slot 42 in the ring or hub 22. The neck 56 of the member 54 is of approximately the same length as the depth of the ring 22, as will be apparent from FIG. 13, and thus when the ring 22 is placed over the neck 56 and rotated until the lug 55 fits into the slot 42, the rim of the ring 22 will seat against the shoulder 58 on the alignment adapter member 54, after which the sleeve 53 can be moved forward to clamp the jaws of the collet about the ring. This secures the ring with its axis coaxial with the axis of support 47, and containing the ultimate optical center of the lens, as located in the blank.

The generating grinding wheel 50 is rotated by a motor 60 (FIG. 11) which in turn is mounted on a sector plate 62 pivotable about the pin 63, which in turn is mounted on the lower plate 65. Rotation of the sector plate about pin 63 will change the angle at which the wheel 50 engages the lens blank, and thus vary the radius of one surface generated on the blank. This surface is the one extending vertically at right angles to the page when viewing FIG. 11. The lower plate 65 is carried on a slide construction 67 which in turn is mounted on a pivotable block 58. This block is arranged to rotate about the pin 70, or its equivalent, and thus to move the lower plate 65, and all structure carried thereon, in an arc about this point, as indicated by the arrow 71. This motion sweeps the generating wheel across the lens blank from top to bottom of FIG. 11, thereby determining the radius of the other curve of the toric surface. The angular setting of the sector plate 62 and the location of the pivot point 70, with reference to its spacing from the chuck, are varied by suitable controls on the machine to determine the radii of the toric surface according to the prescription.

Once the toric surface is generated on the blank, it is ground and polished, using conventional surfacing machines. The fixture rings or hubs are still attached, and the sockets 26 in the ring 20 are engaged by pins 75 (FIGS. 14 and 15) in these machines. The pins extend from a cross bar 76 which is bolted to a drive arm 78. The forward end of this arm is engaged by a pressure pin 80 which in turn is forced downward by spring 82. The lens blank 10, with the generated toric surface thereon, rests upon a formed tool 85 the upper surface of which is a complementary or plus toric surface to that surface generated on the blank. These are standard types of tools, of which there may be a number kept in stock, or if necessary shaped to the proper surface configuration by known methods.

The tool carries on it a suitable grinding or lapping surface, and a slurry of abrasive or polishing compound may also be introduced by known means. Arm 78 is driven in such a manner that pins 75 move over form 85 in an irregular manner, to avoid introduction of any deviation in the toric surface by repeated contact between the same areas of the form and the surface generated on the block. By performing the grinding and polishing steps in this manner, the desired surface is ground and polished about the mechanical center, and in a balanced condition, recalling that the blank was contoured about the ultimate mechanical center, thus assuring accuracy of cylinder axis and avoiding unequal glass removal during the smooth grinding operation which could result in an undesirable shift in the position of the optical center.

If an asymmetrical contour has been previously formed on the blank instead of a symmetrical contour, the fixture rings or hubs are no longer required after the foregoing procedure is completed, and they are removed in a suitable manner. In the case of the low melting alloy materials previously mentioned, this may be done by applying heat or by immersing the assembly in sufficiently hot water or other suitable liquid, thereby freeing the polished blank from the fixtures. The final or finish edging operation is accomplished by fitting the polished blank 10 into a centering holder (FIGS. 16 and 17) and this holder, as will be apparent from the drawings, accommodates the temporary asymmetrical configuration of the blank periphery, thereby assuring that the mechanical center of the blank corresponds with the cam axis of the edging machine, and assuring that the cylinder axis of the blank will be correctly related to the edge of the finished blank. It will be obvious that this result follows from the fact that the intermediate asymmetrical edge contour formed on the blank, prior to generating, was in turn formed with reference to the mechanical center ring or hub 20, and the hub in turn was properly located with respect to the optical center and the optical hub 22. Therefore, when the centering holder receives the intermediate contour, the proper alignment is automatically established and maintained during final edging.

It should be understood that it is possible, according to the invention, to form a symmetrical contour on the lens blank in the initial contouring operation. The essential purpose of that operation is to provide a blank of reduced size which is essentially balanced about the ultimate mechanical center, because this reduces the size of the blank on which the toric surface is generated, and because the grinding and polishing operations can be performed with a balanced blank, as previously described.

If a symmetrical contour, such as circular, is formed during the initial contouring operation, then of course the blank itself will have no reference to the alignment of the toric surface to the final contour. In such an instance, the blank can be placed in the alignment tool before the fixture rings are removed, referencing the blank in the tool from the mechanical center ring 20, and particularly with regard to the alignment of the sockets 26 in that ring. Then, after the blank is gripped in the alignment tool the rings can be removed in any suitable manner, such as immersing the assembly, with the tool gripping the blank, in hot water to melt the bonding alloy.

The preferred process, however, embodies the forming of an asymmetrical contour as previously described, and as shown in the drawings. In such case, the alignment tool, shown in FIGS. 16 and 17, includes a handle 87 on which is formed a contoured jaw 88, exactly complementary to the edge portion 27 formed on the blank in the edge portion 27 formed on the blank in the previous contouring operation. Thus, the blank is fitted to the jaw 88 in a predetermined aligned position. The blank is held in this position by a jaw 90 having a plurality of holding clips 91 pivotally mounted thereon, the jaw 90 being hinged to the handle 87 through the bolt 92, and including an operating handle 93 which can be manipulated to open the jaws against the force of the spring 94 which normally holds them closed against the blank. The handle 87 has an arm 95 extending laterally therefrom in rigid predetermined relation, and this arm is formed with a slot 97 (FIG. 16) of predetermined dimensions, the slot being, therefore, a precise index to the alignment of the blank in the tool.

FIG. 18 illustrates the general arrangement of a suitable conventional final edging apparatus which functions in generally the same manner as the contouring tool previously described and shown in FIG. 9. The blank 10 is gripped between an axially fixed padded jaw 100 and an axially movable padded jaw 102 which can be reciprocated by an air cylinder, a portion of which is shown at 103. The jaw 100 is provided with relieved portions 104 forming a section thereon complementary to the slotted tool portion 97, and thus serving to align the blank when inserted by the tool between the jaws, until the jaw 102 clamps the blank in position, whereupon the tool can be released and withdrawn. Shaft 105 is rotated by a suitable drive motor (not shown) and this shaft carries a final contour cam 106 which operates against a plate or the like 107, including a switch for controlling the rotation of shaft 105, to move the entire assembly of jaws, shaft, and cam, including the blank, toward and away from the rotating finish edge grinder 108. The wheel of this grinder is dressed to form the proper bevel edge on the finished lens, and of course by means of this apparatus the ultimate contour is formed on the finished lens about the mechanical center, and the lens is thereby prepared to be mounted in a spectacle frame of predetermined dimensions.

The drawings also illustrate the novel apparatus with which the fixtures are properly aligned and attached to the semi-finished blank. FIG. 19 is a diagrammatic representation of the linkage, fixture mounting, and alignment configuration of the apparatus. The semi-finished blank 10, with its front surface uppermost, is placed in a holder 110 (FIGS. 22 and 27). This holder rests upon a tubular mounting 112, which is supported for vertical movement on the base plate or table 115. This movement is indicated by the double headed arrow in FIG. 19. The cylinder 112 includes a holder support base or pedestal 117, and directly above there is a ring-like mounting, indicated by the general reference numeral 120, which is arranged to hold the mechanical center fixture ring 20. This mounting is incorporated in a link 122 which is pivotally attached at its opposite ends to side links 123 and 124 which in turn are pivotally attached to the back link 25. These links form a parallelogram linkage which has a fixed pivot point at the joint of links 123 and 125, as indicated by the stationary mounting post 127. The link 124 includes a forward extension 128 carrying a stylus 129 (FIG. 22), and thus for any given movement of the stylus the ring mounting 120 will partake of a corresponding proportionate movement over the blank 10, producing a desired referenced position of the fixture ring 20 over the blank.

Similarly, an upper mounting link 130 is provided to carry the optical center fixture ring 22. Details of the particular holding mechanism within the mounting ring 130 are described further on. The mounting link is incorporated as a part of a front link 132 which is pivotally attached to side links 133 and 134, and these in turn have pivotal connections to the back link 135, thus forming a separate parallelogram linkage which is mounted to move about the stationary post 137 incorporating the pivotal connection of links 133 and 135. Linkage 134 includes a rigid forward extending arm 138, and this arm mounts a second stylus 139. Again, movement of the stylus to any predetermined position will produce a reflected proportionate movement of the mounting link over the lens blank to position the hub 22 in corresponding fashion with respect to the blank.

The details of the mounting ring assembly 120 are shown particularly in FIGS. 27, 28 and 29. The arm 122 is formed with or integrally connected to a ring-like member 150 which receives a cylindrical bearing plate member 152. This bearing, as one of its functions, provides a rotatable mounting for the actual holder assembly which in turn supports the mechanical center ring or hub 20. The holder is formed of a bottom plate 153 suitably fastened to a cylindrical holder ring 155 which has an upper flange or shoulder 156 resting on the bearing member 152. Incorporated in the ring 155 is the actual mounting or holder structure for the ring 20, in the form of a plurality of hemispherical heads 158 each carried on a thin flexible supporting leaf 160. The heads engage in suitable socket holes 161 (also in FIGS. 4 and 6) formed in the sides of ring 20, as shown, in precise relation to the sockets 26.

The leaves 160 are supported on blocks 162 which are slidable in slots 163 formed in the main mounting ring 155. A head 157 extends part way into the block 162, and is also received in an eccentric slot 164 formed in the control plate 165 (FIG. 28). This plate is rotatable with respect to the main mounting or holder ring 155, and is retained thereon by a cover ring 167 secured to the main ring 155 by one or more screws 168. These screws extend into the heads of bolts 169 which in turn are threaded into the main ring 155, and which have their heads engaged in arcuate slots 170 formed in the ring 165 to guide it in coaxial rotary movement with respect to the main holder ring 155.

There is a small handle 172 on the plate 165 and a larger handle 175 fastened to the cover ring 167. The latter handle will control rotational movement of the entire holder assembly in the bearing 152, whereas handle 172 will control motion of the plate 165 to produce radial movement, in and out, of the heads 158, either engaging or disengaging them with the ring 20. These handles are normally urged apart by the spring 176 to urge the heads 158 inwardly.

The outer ring part 150, which as mentioned is integral with the arm 112, carries an index indicator plate 178, and the zero mark on this plate cooperates with a scale 180 fastened to the lower holder ring 153. When the zero index and the zero mark on the scale are aligned, they represent zero angle for cylinder axis. In the drawing the parts are illustrated in a position where the cylinder axis is set at the five degree position by rotating the holder assembly this amount.

Extending into the general central area of the holder assembly 120 is a finger 190 (FIGS. 22, 27 and 28) which is of predetermined rectangular configuration. This finger is mounted on (preferably an integral part of) an arm 192 which is fixed to the bearing plate 152. This finger 190 is arranged to extend within the outer fixture ring or hub 20, particularly as seen in FIGS. 27 and 28, and serves as an index to the horizontal alignment of the finished lens as determined in the blank. As will be described, the finger 190 functions to form the cavity 24 in the bonding material (FIG. 4), transferring this reference or index into the assembly of fixture rings and lens blank.

Immediately above the holder ring assembly 120 is the upper holder ring assembly 130. This likewise comprises a fixed or carrying ring 200 which is formed as a part of the arm 132. The rotatable mounting for the optical center ring 22 is provided by a bearing 202 which engages a complementary bearing member 204, and the latter has fastened to it upper and lower rotatable mounting rings or plates 205 and 207, respectively. A sleeve 210 is rotatably mounted within the bearing 204, and its connected parts. A control ring or handle 213 is connected to sleeve 210, and functions as a convenient device for adjusting the sleeve and connected parts rotatably in the holder.

The upper plate 205 carries an index marker 214 which cooperates with upper scale 215, and this scale in turn is carried by a plate 216 fastened to the sleeve 210. Scale 215 reads the same as scale 180, and the same cylinder adjustment is, of course, set into the upper hub as into the lower hub.

The sleeve 210 provides an elongated bearing surface in which is mounted a shaft 220, connected by means of the key 222 to rotate with the sleeve, but vertically slidable in the sleeve. The lower end of the shaft is of considerably reduced cross section, forming an elongated rod like end 224 terminating in a flat sided swivel mounted piece 225. A hub support head 228 is pivotally mounted on the lower rod part 225 by means of a cross pin 230, and thus the head 228 is free to swing within limits, about the axis of this pin. The head is provided with a number of permanent magnets 232, the lower ends of which are vertically located so that, when ring 22 is placed in position, as will be described further on, the magnet ends nearly, but not quite, touch the ring 22.

Projecting from the bottom of the head, as viewed in FIG. 31, and as seen in FIG. 30, are ball-ended index probes 235. These are aligned at right angles to the axis of the pin 230, and they are adapted to engage in index sockets 236 formed in the interior of the smaller fixture ring 22, which it will be recalled is adapted for alignment with the ultimate optical center of the lens as located on the blank. The ring 22 is slipped over the head 228, as shown in FIGS. 27 and 30, and the magnets hold the hub or fixture ring against the head, engaging the probes 235 with the sockets 236. This assures that rotation of the handle 213 according to the prescribed cylinder axis will be reflected as like rotation of the hub 22, and the pivoting action of head 228 about pin 230, as well as the permissible movement of he hub about a transverse line through the probes 235, will permit the base legs of the hub 22 to seat uniformly upon the finished surface of the semi-finished blank in the holder while maintaining the prescribed cylinder axis correction. Hub 22 may thus assume a tilted position on the blank, as seen in FIGS. 6 and 15, but its axis will contain the ultimate optical center of the lens as located on the blank.

The shaft 220 can be lowered through the sleeve 210, to move the hub 22 down into a position within the mounting of the ring 20 (shown in dotted lines in FIG. 27). This movement is accomplished by a pusher rod 240 which engages a hardened cap 242 fastened to the top of spindle 220. The pusher is mounted in the end of an actuating arm 245 (FIGS. 20, 22 and 27) and this arm is pivoted on the link 132, as indicated at 246. The arm 245 is moved by an air cylinder 248 through a connecting link 249.

Since the lens blank is mounted referenced to the frame or base of the apparatus, it is necessary to maintain an index on the fixture hub holding device which likewise remains referenced azimuthly to the base. During manipulation of the apparatus to locate the centers of the hubs properly with respect to the lens, each of the upper and lower holders may partake of some rotational movement with respect to their fixed pivot points, namely the parts forming the posts 127 and 137. Accordingly, the apparatus includes restraining or compensating linkage attached to the bearing member 152 within holder member 150, and to the bearing member 204 within the upper holder member 200. Such linkages are shown in FIGS. 20, 22, 33 and 34.

The restraining linkage for the lower or mechanical center hub holding ring is provided by a rod 250 pivotally attached to an ear 251 on the plate blank 152a which is bolted (FIG. 27) to the bearing member 152, and which also provides the mounting for the finger 190 and its arm 192 (FIG. 33). At its other end rod 250 is pivotally attached to a bell crank member 252, and this crank is mounted to pivot freely at the joint between the links 122 and 123. A fixed or reference member 253 is carried by the structure forming the post 127, and is fixed with respect to the frame including the base plate 115. The reference member 253 has a projecting ear, shown particularly in FIG. 33, to which is pivotally attached a connecting rod 254, and this rod is pivotally attached to the crank 252. Thus, although the arm 122 may rotate about the post 127 and/or its joint with arm 123, the bearing member 152 is prevented from rotating by the above described restraining linkage, and the index 178 carried on the plate blank 152a does not rotate with respect to the frame of the machine, although the supporting portions of the arm 122 may rotate with respect to the bearing member and all of the hub supporting and aligning mechanism carried therewithin.

Hence, once the prescribed cylinder axis is set into the mechanism supporting the hub 20, this azimuthal relation will not be disturbed by subsequent movements of the pantagraph mechanism, which movements may cause displacement of the center of such hub as previously explained.

Similarly, the bearing 204 is fastened to plate 205, as shown in FIG. 27, and is restrained against rotation resulting from movements of the upper pantagraph mechanism by the following restraining linkage. As shown in FIG. 20, the plate 205 includes a forwardly projecting ear 255 which supports the index marker 214. Pivoted to this ear is a rod 256 which is pivotally attached at its other end to a bell crank member 257. This member is rotatably mounted on the pivot connection between the links 132 and 133. It is connected through rod 258, which has pivot connections at both its ends, to a reference member 259 which is likewise fixed with respect to the base plate 115, being mounted in fixed position on the structure forming the fixed post 137. The function of the upper restraining linkage is the same as described and attributed to the corresponding lower linkage including parts 250–254.

In order to provide for alignment and the necessary freedom of movement of the parallelogram or pantagraph mechanisms, comprising the various previously described links which position the lower and upper ring holder devices 120 and 130, suitable bearing supports are provided, particularly as shown in FIGS. 22 and 23. For example, a bearing support is formed beneath the pivotal connection of links 122 and 124 by a depending body 260 which is threaded to the pin 261 forming the pivot connection between these links. A bearing holder 263 has a threaded stud portion 265 connected into the holder 260, providing adjustment therebetween, and this adjustment is maintained by the lock nut 266. The bearing holder carries a hardened ball 267 which seats against an insert sleeve 268, and which in turn rests upon a smooth platform 270 mounted on a pedestal 271 at the requisite height above the table 115.

In a similar fashion, the link 132 has mounted from it a bearing carrier 272 (FIG. 22) containing a hardened ball bearing 273 which rests against a flat platform piece 274 fastened to link 122. This, in effect, maintains the desired vertical spacing between these links and transfers the outboard weight of the upper linkage to the lower linkage, and thence through the bearing 257 to the lower supporting platform 270.

The hollow blank holder 110, as mentioned previously, rests upon a platform or pedestal 117, which as shown in FIG. 27 has a hollow center, and which is mounted upon the vertically movable support tube 112. A number of permanent magnets 275 are suitably mounted in the pedestal structure 117, and are so designed and arranged that they afford a predetermined retaining force tending to maintain the holder 110 in any position in which it is placed, but still permitting the holder to be adjusted on the pedestal without excessive exertion. This controlled retaining force is desirable to assure that the holder, and the blank therein, can be moved through small adjusting motions to a precise aligned position. Once this position has been achieved, however, it is desirable to clamp the holder against further accidental movement, and for this function one or more selectively energizable electromagnets 278 are also mounted in the pedestal 117. During the alignment procedure these electromagnets are deenergized, and when visual alignment is achieved they are energized to clamp the holder 110 in position.

The mounting tube 112 is movable between a lower alignment position, shown in FIG. 22, and a raised assembling position, shown in FIG. 27 where the blank holder 110 is moved to within the lower fixture mounting holder 120. This vertical movement of the tube 112 is achieved by moving a driving link 280, which is pivoted beneath the table 115 at 282, by a suitable power source such as a conventional air cylinder 285 partially shown in FIG. 22. The arcuate motion of the end of link 280 is accommodated to straight vertical movement of tube 112 by means of a pin 287 on the tube which extends into an elongated slot 288 formed in the end of the arm.

Within tube 112 there is an alignment light, in the form of a small electric light bulb 290 which may be energized from a suitable source. Light from this source serves to illuminate the blank 10 in the holder 110, particularly making visible to the operator the multifocal segment 12, about which the alignment proceeds in the case of operations involving processing of multifocal lenses.

A target projector and blank viewer is provided in the form of a housing 300 (FIGS. 22, 24 and 25) which is carried on an arm 302 fixed to a vertically extending rotatable shaft 304. This shaft is mounted in suitable bearings, and its rotation is controlled by means of handle 305 extending from the shaft. The projector 300, therefore, can be swung from its operative position above the holder 110, when the latter is in its lower or alignment position, and an inoperative position away from the holder to permit raising of the holder to its assembled position.

The front face of the projector 300 carries a half-silvered mirror 310. When the projector is in its operative position the point 312 (FIG. 25) on the mirror is precisely aligned with an arbitrary vertical axis which, if the fixture rings were centered thereon, would represent location of the ultimate mechanical center, the ultimate optical center, and the center of the top edge of the multifocal segment 12, all at the same point.

The projector 300 includes a light source in the form of a bulb 314 which projects light through a target transparency 315, the resultant image of the target appearing on an internal mirror 317. The image of a typical alignment target is shown in FIG. 2, indicated by the general reference numeral 320, and superimposed on the blank 10 as it actually appears to the operator. The target includes a horizontal line 321 and pairs of alignment marks or lines 322. It will be noted that on each side of the target different ones of the alignment lines are of different appearance. For example, there is a solid line, next a line of short dashes, followed by a line of long dashes, followed by a longer solid line which extends across the horizontal reference line 321. The same arrangement of different types of alignment marks is on the other half of the target in complementary fashion, and thus to the observer there are pairs of lines of like appearance.

During the alignment operation the operator swings the projector into its alignment position over the blank holder 110. This action can be used, as by operating suitable switches from an arm (not shown) fixed to shaft 304, to illuminate the light bulbs 290 and 314 and to deenergize the electromagnets 278. The operator moves the holder, in which the blank is retained by the spring 323 (FIG. 1) to align the multifocal segment 12 of the lens with the target. The center point of the target, indicated at 325, is to be located at the middle of the upper edge of the multifocal segment. This point in the target appears through the half-silvered mirror 310 at the point 312 (FIG. 25) which as previously noted is the vertical reference axis from which the prescription measurements and displacements are made in a multifocal lens. A viewing piece 330 is supported in a mounting ring 332 on a mast 333 which extends upward from the base or bearing mounting for the slidable tube 112. The center line of the viewing piece or scope is aligned to intersect the half-silvered mirror 310 at the point 312 and to intersect the point 325 in the target image as it appears on the interior mirror 317.

Thus, the operator can manipulate the lens holder to center the multifocal segment in the blank with respect to the target, using the pairs of reference lines 322 to align the segment in the middle of the target, and using the horizontal line 321 of the target to produce the desired horizontal positioning of the top of the multifocal segment 12. The multifocal segment shown is of an improved type having a flat upper edge which assists in this alignment, but of course if the segment has some other configuration its top edge can still be aligned visually in the same manner. Then, when the operator swings the projector to its inoperative position the lights can be extinguished and the electromagnets are energized to clamp the holder 110 in the aligned position.

The next step in operation of the apparatus is to position the fixture holders in prescribed relation to the blank. For this purpose the arms 128 and 138 attached to the side links 124 and 134, respectively, each carry a stylus. The stylus 129 is shown in detail in FIG. 21, and includes a sleeve 340 fitted within a bore 342 which is formed vertically through a mounting boss 333 secured to the end of arm 128. The body of the stylus, indicated at 345, includes an upper part 346 of reduced size which extends through sleeve 340, there being a light spring therebetween urging the body of the stylus downward. A suitable stop link 348 limits the downward movement of the stylus.

At its lower end the body of the stylus is provided with a pointer or tip 350 which can be engaged in any one of a grid of alignment holes 352 formed in an alignment plate 355 which is mounted at the requisite heighth over table 115 on a suitable standard 357. The plate 355 is of sufficient size to accommodate a substantial range of movements of the stylus corresponding to displacements of the mechanical center of a finished lens with respect to the top center of the multifocal segment.

The center hole of the grid of alignment holes 352 is located such that with the stylus pointer 350 engaged therein the axis of a fixture ring 20 in the holder 120 will intersect the center of the top edge of the multifocal segment of a blank properly aligned with the target.

In a preferred embodiment of the application, constructed as illustrated in the drawings, the pantagraph mechanism is arranged to give a 4:1 motion reduction between the stylus 129 and the holder 120. In other words, movement of the stylus for a distance of four millimeters will produce a corresponding movement of the holder, and thus of the ring 20, of one millimeter. The alignment holes 352 formed in the plate 355 are constructed in grid-like fashion about the center hole, along horizontal and vertical lines (as viewed in FIG. 20) at spacings of two millimeters on centers. Thus, moving the stylus tip from one hole to the next will produce a displacement of the axis of the fixture ring of one-half millimeter in the corresponding direction.

In the same fashion, the arm 138 fixed to the side link 134 carries the stylus 139, comprising an elongated stylus body 360 depending vertically from a mounting hub or boss 362 which is secured to the end of arm 138. The stylus body 365 is of the same general construction as the body 345, and is spring loaded in the same manner, accordingly details of this construction are not shown. The body 365 terminates in a tip 370 which cooperates with a grid of alignment holes 372 formed in an alignment plate 375 which is mounted next to the plate 355, upon a suitable pedestal 377 (FIG. 22). The operation of the stylus 139 and the upper linkage system is exactly the same as previously described, and will produce the desired displacement of the axis of the fixture ring 22 as prescribed for the location of the ultimate optical center of the lens in the semi-finished blank.

Accordingly, the operator aligns the segment 12 with the target 320, places the respective mechanical center and optical center stylii 129 and 139, and performs the necessary azimuth alignment to the prescribed cylinder axis by rotating the handle 175 on the lower holder 120 and by rotating the upper wheel 213 to the same setting.

The alignment procedures having been completed, the apparatus is now used to secure the fixture rings to the front (in the example) or semi-finished surface of the blank 10.

This operation is accomplished by energizing the air cylinder 285 to raise the holder 110 into the center of the lower link holder 120, thus bringing the blank into contact with the ring 20. The flexible nature of the mounting leaves 160 (FIGS. 28 and 29) permits the base of the ring 20 to accommodate and seat about its entire circumference on the blank while holding its alignment with the ultimate mechanical center. Next, the air cylinder 248 is actuated causing the fixture ring 22 to be lowered onto the blank, and the ring can swivel as necessary, about the pin 230 in one direction or about a line through the probes 235 in the other direction, to seat this ring upon the blank in its aligned condition with the ultimate optical center.

The apparatus then is caused to deposit a liquid charge of bonding material between the rings 20 and 22 and over the surface of the blank 10 within the area of the ring 20. Since the smaller of "optical center" fixture ring 22 is provided with a number of feet, the material will flow also into the interior of this ring, and of course the material will flow around the horizontal reference finger 190.

A suitable device for supplying the liquid bonding material at this time is shown in FIG. 26. It includes a tank 380 which preferably is mounted on a base plate 382, and is provided with an electrical heater 383, or its equivalent, to keep the bonding alloy at a temperature above its melting point in the tank. One suitable type of alloy, which provides the requisite adherence to the lens surface and to the fixture rings, is an antimony-lead compound (or the like) having a melting point of around 158° F. The tank is provided with a metering valve 385, shown schematically, which can be opened by manipulating the handle 386 to raise the valve control link 387, thus causing the valve to pass a predetermined quantity of the molten material through the curved discharge chute 388 and into the spout 390.

The entire above described tank and assembly is mounted on slide bearings 392 which are movable back and forth on rods 393 which are fixed at the desired level behind the mechanical ring holder 120. When not in use, the entire assembly is moved back on the rods, to the right of FIG. 26, and when the operation requires a supply of molten bonding material, the tank and associated apparatus is moved forward, by any suitable mechanism, to bring the spout 390 over the area between the rings 20 and 22. The bonding material hardens rapidly, for example within about thirty seconds, after which the resultant assembly of lens blank and fixture rings is removed from the apparatus, leaving the index cavity 24 in the bonding material as a reference to the ultimate horizontal mounting of the finished lens, as determined on the blank.

The invention also contemplates use of previously marked record cards, or equivalent, for controlling the positioning of the stylii 129 and 139. Thus, referring first to FIG. 20, a portion of a control or record card 400 is shown extending over the plate 375. This card has an actual control section 402 of predetermined dimensions which is positioned on the plate 375, and a record section 403 which may form a convenient place for recording of the prescription data to be used for processing the lens. There is also shown a portion of a further control card section 404, positioned on the plate 355. This card section initially is a part of the record card 400, as will presently be described.

In the processing laboratory, a semifinished blank, having one finished surface of predetermined constant radius, is selected and placed in a tray along with the record card 400. Data is transcribed onto the card from the optical prescription. This data may include, for example, the prescribed cylinder axis, the prescribed radii for the toric surface, the thickness (i.e., at the optical center, normally the thinnest or thickest part of the lens) as well as the frame size, shape, the type of edge bevel required on the finished lens, and of course a tray indentification number to assure that the card is kept in the proper tray with the blank all during its processing. The card section 404 is pierced at the place which will locate the stylus 129 in correct position to provide the prescribed location of the mechanical center, and the card section 402 is similarly pierced to control the prescribed location of the optical center.

Apparatus for this purpose is shown in FIGS. 35 and 36. It comprises a base plate 405 mounted on legs 406, and having a recessed area 410 of a size to accommodate a record card 400. At one edge, to the right as seen in FIGS. 35 and 36, there is a suitable opening 411 providing for a finger grip on one edge of the card, and an interference piece 412 engages a bias cut corner of the card to assure proper alignment. The recessed area 410 includes a through aperture or rectangular opening 415, which is of sufficient extent to accommodate the central areas of the card sections 402 and 404. Over the top of the base or main body 405 there is a slide member 420, which is of generally H shape, as shown in FIG. 35, including opposed side members 422 and 424 which are formed to engage around the edge of the base plate 405. The arm or side 422 includes a spring 423 which serves to maintain the cross slide in proper alignment with its center section 425 extending transversely over the card sections 402 and 404.

The arm 422 is provided with an index, designated by the letter O, which cooperates with a scale 428, and the arm 424 is provided with an index designated by the letter M which cooperates with a further scale 430. Transversely of the cross arm 425, at regularly spaced intervals, there are plurality of indexing and punch guide holes 435. The center hole, marked by the numeral 0 on the accompanying scale 436, is arranged to intersect the longitudinal center line of a card placed in the apparatus. It will be noted that the holes are regularly spaced, and marked accordingly, to provide a measurement equivalent to one-half millimeter increments of space (recalling that the pantagraph mechanisms have a 4:1 reduction) from the center of a lens blank.

Thus, with the index marked O aligned with a predetermined mark on the scale 428, the center or zero hole in scale 436 will be spaced up or down from the center of the card section 402, which controls the placement of the hub centered on the optical axis. The operator can then count off, in either direction from the center hole of the scale 436 to determine the transverse displacement of the optical axis, and he can insert a suitable punch or piercing instrument 440 (FIG. 36) through the appropriate hole in the scale 436. Beneath the card, extending across the opening 415, there is a stripper bar 442, having holes corresponding to those in the scale 436. This bar provides a suitable support for the card during the punching operation and assures that a clean hole is pierced therethrough.

In similar fashion, with the index marked M appropriately aligned with the correct numeral on the scale 430, the scale 436 will be aligned over the card section 404, and the operator again can displace the punch with reference to the zero mark on scale 436 and pierce a hole through the card section 404 representing the location on the mechanical center.

The resultant control card thus will be pierced in two places, the hole in section 402 forming a record of the prescribed displacement of the optical center, and the hole in section 404 forming a representation of the location of the mechanical center as determined or referenced in the blank. The card thus provides a physical record which can be used to center the fixture hubs appropriately according to prescription.

The marked card 400, as noted, is kept in the processing tray with the blank, and when the semifinished blank is mounted in the holder 110 and aligned with the target, as previously described, the card sections 402 and 404 are separated and inserted in their corresponding places over the plates 355 and 375 as shown in FIG. 20. Then, the operator can merely move the stylus tips 350 and 370 into the hole in each of the corresponding card sections, and the tips will be placed through the hole in the card and into the corresponding hole of the plate therebeneath to assure precise and maintained alignment of the apparatus. Thus, the marked or punched card is used as a quick reference locator, but the engagement of the stylus tip with the corresponding hole in the alignment plate is used as the precise means of aligning the pantagraph linkages.

The various functions of the fixture alignment and attachment device have been described in conjunction with the positioning and securing of fixture rings or hubs on a semi-finished multifocal blank. The basic reason for this is that the apparatus is particularly useful in the steps of processing such blanks in accordance with the invention. It will be understood, however, that the apparatus is also useful in the processing of so-called single vision lenses in accordance with the present invention.

For example, the lens blank holder 110 provides a convenient and precise means for locating or positioning a blank, such as a semi-finished blank for a single vision lens, in which (preferably) the front surface of the lens is finished to a predetermined constant radius, i.e. as a portion of a spherical surface. In order to provide the prescribed correction for a single vision lens the prescribed surface must be formed on the other or unfinished side of this blank, and if the prescribed surface is a toric surface, such that the azimuthal alignment of the toric surface has the prescribed orientation with respect to the ultimate peripheral contour of the finished lens. Of course if the prescribed surface is a spherical surface, as it may be in some cases, then the azumuthal alignment is not needed. Further, the ultimate peripheral contour must be formed so as to position the mechanical center at the required location with respect to the optical center.

The apparatus can readily hold a single vision lens blank in a predetermined aligned position in the holder 110, for example with the center of the blank aligned with the "zero setting" of the fixture ring holders 120 and 130, and these holders can be manipulated to align fixture rings with respect to the ultimate optical center and ultimate mechanical center of the finished lens as located in the blank, rotate the rings according to the needed cylinder axis, the horizontal reference or index can be provided in the same manner by the depending finger 190, and the rings attached to the lens blank in the same manner, after which the blank can be processed in accordance with the invention to form a single vision lens according to prescription.

The present invention, therefore, provides a novel method of preparing ophthalmic lenses according to prescription, in which accuracy of alignment of the optical surfaces is assured and maintained, and by which method the finished lens can be obtained with the use of a minimum of skilled technical operators. Furthermore, the method assures continuity of alignment throughout the processing of the lens blank, and avoids the edge ctting operation now customarily performed on the blank after the toric surface has been generated and finished. The optical surface is ground or otherwise generated on a blank of reduced size, with consequent savings in time required for generating and in wear of the generator grinding wheel, and the same economies of time and materials carry through the subsequent grinding, polishing, and edging operations. As noted, the finishing operations on the toric surface, grinding and polishing, are performed with pressure exerted on a blank which is balanced about the ultimate mechanical center of the finished lens, thereby maintaining, during these subsequent operations, the optical center in the same position in which it was located during generating.

The apparatus provided by this invention enables an unskilled operator quickly to locate and secure the fixture rings to the lens blank in precise alignment according to the prescription, and with a minimum exercise of discretion in the alignment operation. Thus, the apparatus assures precise control of the required geometrical properties of the finished lens. Furthermore, by using the preferred card indicator apparatus, a convenient and handy record can be retained, by means of which a duplicate lens, precisely according to prescription, can be prepared quickly, actually without need of returning to the original prescription.

Other advantages of the present method and apparatus will be apparent to those skilled in the art.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, attaching fixtures to the finished surface of the semi-finished blank aligned with the ultimate mechanical center and the ultimate optical center respectively and referenced according to the ultimate horizontal alignment of the finished lens, forming the prescribed optical surface on the unfinished side of the lens blank with reference to that fixture previously related to the ultimate optical center, finishing the thus formed prescribed optical surface, and forming on the blank the final edge contour of the finished lens with respect to the mechanical center and the required horizontal alignment of the lens by employing the mechanical center and horizontal alignment references derived from the fixtures.

2. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, attaching fixtures to the finished surface of the semi-finished blank aligned with the ultimate mechanical center and the ultimate optical center respectively and referenced according to the ultimate horizontal alignment of the finished lens, reducing the size of the semi-finished blank by removing material from predetermined portions of the periphery of the blank, forming the prescribed optical surface on the unfinished side of the reduced lens blank with reference to that fixture previously related to the ultimate optical center, finishing the thus formed prescribed optical surface, and then forming on the reduced blank the final edge contour of the finished lens with respect to the mechanical center and the required horizontal alignment of the lens by employing the mechanical center and horizontal alignment references derived from the fixtures.

3. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, attaching fixtures to the finished surface of the semi-finished blank aligned with the ultimate mechanical center and the ultimate optical center respectively and referenced according to the ultimate horizontal alignment of the finished lens and the prescribed cylinder axis, forming the prescribed optical surface on the unfinished side of the lens blank with reference to that fixture previously related to the ultimate optical center, finishing the prescribed optical surface while supporting said blank with reference to that fixture previously related to the ultimate mechanical center, and forming the final edge contour of the finished lens with respect to the mechanical center and cylinder axis by employing the mechanical center and horizontal alignment references derived from the fixtures.

4. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, positioning blank holding fixtures on said blank with respect to said ultimate mechanical center and to said ultimate optical center on the blank and to the ultimate horizontal alignment of the lens, rotatably adjusting said fixtures relative to said blank in accordance with the prescribed cylinder axis for the finished lens, then securing said fixtures to the finished surface of the semi-finished blank, forming the prescribed optical surface on the unfinished side of the lens blank with reference to the holding fixture previously related to the ultimate optical center, finishing the thus formed prescribed optical surface, and forming the final edge contour of the finished lens with respect to the mechanical center and cylinder axis by employing the mechanical center and horizontal alignment references derived from the fixtures.

5. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, positioning fixtures on said blank with respect to said ultimate mechanical center and to said ultimate optical center on the blank, rotatably adjusting said fixtures relative to said blank in accordance with the prescribed cylinder axis for the finished lens, then securing said fixtures to the finished surface of the semi-finished blank, removing material from predetermined portions of the periphery of the blank to provide a smaller blank of essentially balanced condition with respect to said ultimate mechanical center, forming the prescribed optical surface on the unfinished side of the lens blank with reference to the holding fixture previously related to the ultimate optical center, finishing the thus formed prescribed optical surface while supporting said blank with reference to the fixture previously related to the ultimate mechanical center, and forming on such smaller blank the final edge contour of the finished lens with respect to the mechanical center and cylinder axis by employing the mechanical center and horizontal alignment references derived from the fixtures.

6. A method of producing an ophthalmic lens according to prescribed dimensional relations, comprising the steps of supporting a semi-finished lens blank in a predetermined position referred to the horizontal alignment of the finished lens as determined in the blank, determining the location of the ultimate mechanical center of the finished lens and of the ultimate optical center of the finished lens on said blank in such position, positioning separate blank holding fixtures on said blank with respect to said ultimate mechanical center and to the ultimate optical center on the blank, rotatably adjusting each of said fixtures relative to said blank in accordance with the prescribed cylinder axis for the finished lens, then securing said fixtures to the finished surface of the semi-finished blank, providing an index in the assembly of blank and fixtures related to the aforementioned horizontal alignment, forming the prescribed optical surface on the unfinished side of the lens blank with reference to the holding fixture related to the ultimate optical center, finishing the prescribed optical surface, and forming the final edge contour of the finished lens with respect to the mechanical center and cylinder axis by employing the mechanical center and horizontal alignment references derived from the fixtures.

7. A method of producing an ophthalmic lens according to prescribed dimensional relations, comprising the steps of supporting a semi-finished lens blank in a predetermined position relating the horizontal alignment and centering of the finished lens to be formed from the blank to the finished surface of the blank, determining the location of the ultimate mechanical center of the finished lens and of the ultimate optical center of the finished lens on said blank in such position, positioning blank holding fixtures on said blank with the respective axes of said fixtures containing said ultimate mechanical center and said ultimate optical center on the blank, rotatably adjusting said fixtures about their axes and relative to said blank in accordance with the prescribed cylinder axis for the finished lens, securing said fixtures to the finished surface of the semi-finished blank, forming an index on said blank related to the ultimate horizontal alignment of the finished lens, forming the prescribed optical surface on the unfinished side of the lens blank with reference to the holding fixture previously related to the ultimate optical center, finishing the thus formed prescribed optical surface, and forming the final edge contour of the finished lens about the mechanical center using said index on said blank to obtain proper relation of the final contour to the cylinder axis.

8. A method of producing an ophthalmic lens according to prescribed dimensional relations, comprising the steps of supporting a semi-finished lens blank in a predetermined position relating the horizontal alignment and centering of the finished lens to be formed from the blank to the finished surface of the blank, determining the location of the ultimate mechanical center of the finished lens and of the ultimate optical center of the finished lens on said blank in such position, positioning blank holding fixtures on said blank with respect to said ultimate mechanical center and to said ultimate optical center on the blank, rotatably adjusting said fixtures relative to said blank in accordance with the prescribed cylinder axis for the finished lens, securing said fixtures to the finished surface of the semi-finished blank, forming on an edge of said blank a temporary index related to the ultimate horizontal alignment of the finished lens, forming the prescribed optical surface on the unfinished side of the lens blank with reference to the holding fixture previously related to the ultimate optical center, finishing the thus formed prescribed optical surface, removing said fixtures from the blank, and then forming the final edge contour of the finished lens about the mechanical center using said index on said blank to obtain proper relation of the final contour to the cylinder axis.

9. Apparatus for use in forming a prescribed optical surface on a lens blank, comprising means for mounting said blank in predetermined location, first tubular fixture means adapted to be secured to said blank in predetermined relation to the ultimate mechanical center of the finished lens, a first holder for said first fixture means, second tubular fixture means adapted for securing to said lens blank in predetermined relation to the ultimate optical center of the finished lens, a second holder for said second fixture means, an index means associated with said lens mounting means to provide an index between the fixture means related to the location of the blank of the ultimate horizontal axis of the finished lens, independent controls for said first and second holder means and for said index means operative to move both said fixture means and said index means into predetermined relation with a lens blank in said mounting means, and attachment means cooperating with said fixture means for interposing an attachment between the fixture means to fix both said fixture means to a blank in said mounting means and for reproducing a locator between the fixture means in said attachment in the assembled fixture means and blank referenced to said index means.

10. Apparatus for use in forming a prescribed optical surface on a lens blank, comprising means for mounting said blank in predetermined alignment with respect to the horizontal alignment of the finished lens to be formed from said blank, first tubular fixture means adapted to be secured to said blank with an axis of said first fixture means containing the ultimate mechanical center of the finished lens, a first holder for said first fixture means, second tubular fixture means adapted for securing to said lens blank with an axis thereof containing the ultimate optical center of the finished lens, a second holder for said second fixture means, an index means associated with said lens mounting means to provide an index between the fixture means related to the position of the blank with respect to the ultimate horizontal alignment of the finished lens, independent controls for said first and second holder means operative to move both said fixture means into prescribed relation with a lens blank in said mounting means, and attachment means cooperating with said fixture means for interposing an attachment between the fixture means to secure both said fixture means to a blank in said mounting means and for reproducing a locator between the fixture means in said attachment in the assembled fixture means and blank referenced to said index means.

11. Apparatus for use in forming a prescribed optical surface on a semi-finished lens blank, comprising means for holding the blank in predetermined location, first tubular fixture means adapted to be secured to the blank with an axis of said first fixture means containing the ultimate mechanical center of the finished lens, a first holder for said first fixture means, second tubular fixture means adapted for securing to the blank with an axis thereof containing the ultimate optical center of the finished lens, a second holder for said second fixture means, index means associated with said lens mounting means to provide an index between the fixture means related to the location on the blank of the ultimate horizontal axis of the finished lens, independent controls for said first and second holder means and for said index means operative to move both said fixture means and said index means into prescribed relation with a lens blank in said mounting means, and attachment means cooperating with said fixture means for interposing an attachment between the fixture means to secure both said fixture means on the finished side of a blank in said mounting means and to produce a locator between the fixture means in said attachment in the assembled fixture means and blank referenced to said index means.

12. Apparatus for use in forming a prescribed optical surface on a lens blank, comprising means for mounting said blank in predetermined location, first tubular fixture means adapted to be secured to said blank with an axis of said first fixture means containing the ultimate mechanical center of the finished lens, a first holder for said first fixture means, second tubular fixture means adapted for securing to said lens blank with an axis thereof containing the ultimate optical center of the finished lens, a second holder for said second fixture means, an index means associated with said lens mounting means to provide an index between the fixture means related to the location on the blank of the ultimate horizontal axis of the finished lens, controls for said first and second holder means and for said index means operative to move both said fixture means and said index means into prescribed relation with a lens blank in said mounting means, attachment means cooperating with said fixture means for interposing an attachment between the fixture means to retain both said fixture means on a blank in said mounting means and to produce a locator between the fixture means in said attachment in the assembled fixture means and blank referenced to said index means to provide alignment holders by means of which the prescribed optical surface is properly formed, and attachments for said controls providing for movement thereof to predetermined locations according to the prescription for the finished lens.

13. Apparatus for use in forming a prescribed optical surface on a lens blank, comprising means for mounting said blank in predetermined location, first tubular fixture means adapted to be secured to said blank with an axis of said first fixture means containing the ultimate mechanical center of the finished lens, a first holder for said first fixture means, second tubular fixture means adapted for securing to said lens blank with an axis thereof containing the ultimate optical center of the finished lens, a second holder for said second fixture means, an index means associated with said lens mounting means to provide an index between the fixture means related to the location on the blank of the ultimate horizontal axis of the finished lens, independent controls for said first and second holder means and for said index means operative to move both said fixture means and said index means into prescribed relation with a lens blank in said mounting means, attachment means cooperating with said fixture means for interposing an attachment between the fixture means to secure both said fixture means on a blank in said mounting means opposite that side on which the prescribed optical surface is to be formed and for reproducing a locator between the fixture means in said attachment in the assembled fixture means and blank referenced to said index means, and attachments for said controls providing for movement thereof to locations represented by marks on previously prepared control records according to the prescription for the finished lens.

14. Apparatus for use in the manufacture of ophthalmic lenses, comprising a blank holder for supporting a semi-finished lens blank with its finished side facing upwardly and being disposed above its unfinished side which faces downwardly, means for simultaneously viewing said blank in said holder and an alignment target superimposed thereupon, means for adjusting said holder to align said blank with respect to said target, first holder means adjustable with respect to said blank holder providing a mounting support for a first tubular fixture to be aligned with the ultimate mechanical center located on the blank, second adjustable holder means for a second tubular fixture to be moved into alignment with the ultimate optical center as determined on said blank, means for rotating each of said fixture holders to produce a predetermined angular relation of the fixtures with respect to said blank according to the prescribed cylinder axis orientation, index means related to said blank holder to form a reference to the alignment of the blank with respect to said target and to provide an index related to the location on the blank of the ultimate horizontal axis of the finished lens, and bonding means cooperating with said fixture holder means and said lens holder to bond interpose a bonding material between the fixtures, the fixtures to said blank in the alignment produced by manipulation and adjustment of said fixture holder means.

15. Apparatus for use in the manufacture of ophthalmic lenses, comprising a blank holder for supporting a semi-finished lens blank, means for viewing the blank while also viewing an alignment target superimposed on the view of the blank in said holder, means for adjusting said holder to align said blank with respect to said target, first holder means adjustable with respect to said blank holder providing a mounting support for a first tubular fixture to be aligned with the ultimate mechanical center located on the blank, second adjustable holder means for a second tubular fixture to be moved into alignment with the ultimate optical center as determined on said blank, means for rotating each of said fixture holders to produce a predetermined angular relation of the fixtures with respect to said blank according to the prescribed cylinder axis orientation, index means related to said blank holder to form a reference to the alignment of the blank with respect to said target to provide an index related to the location on the blank of the ultimate horizontal axis of the finished lens, bonding means cooperating with said fixture holder means and said lens holder to bond interpose a bonding material between the fixtures, the fixtures to said blank in the alignment produced by manipulation and adjustment of said fixture holder means, and means for forming a reference locator between the fixtures in the bonding material in the bonded assembly of fixtures and blank corresponding to the position of index means as referred to said fixtures.

16. An assembly for facilitating the forming of a prescribed optical surface on a lens blank and for shaping the blank into a finished lens for mounting in a spectacle frame, comprising a lens blank of material having known optical properties, holding fixture means mounted on said blank in predetermined alignment with the location on said blank of the ultimate optical center of the finished lens and in predetermined alignment with the location on said blank of the ultimate mechanical center of the finished lens respectively, attachment means securing said fixture means to the opposite side of said blank from the side on which the prescribed surface is to be formed, and index means secured to said blank intermediate said fixture means in said attachment means in predetermined alignment with the orientation on said blank of the horizontal axis of the finished lens and with the location on said blank of the ultimate mechanical center of the finished lens, said fixture means and index means being so constructed and arranged that said assembly can be accurately and operatively mounted during processing of the lens blank into a finished lens having the selected edge contour by referring to the optical center, mechanical center and horizontal alignment references.

17. An assembly for facilitating the forming of a prescribed optical surface on a lens blank and for shaping the blank into a finished lens for mounting in a spectacle frame, comprising a lens blank of material having known optical properties, first tubular fixture means fixed to said blank in predetermined alignment with the location on said blank of the ultimate optical center of the finished lens, a second tubular fixture means secured to said blank in predetermined alignment with the location on said blank of the ultimate mechanical center of the finished lens, attachment means for so securing both of said fixture means to said blank, and index means in said assembly intermediate the fixture means in said attachment means aligned with the orientation on said blank of the horizontal axis of the finished lens and with the location on said blank of the ultimate mechanical center of the finished lens, said fixture means and index means being so constructed and arranged that said assembly can be accurately and operatively mounted during processing of the lens blank into a finished lens having the selected edge contour by referring to the optical center, mechanical center and horizontal alignment references.

18. An assembly for facilitating the forming of a prescribed optical surface on a lens blank and for shaping the blank into a finished lens for mounting in a spectacle frame, comprising a semi-finished lens blank of material having known optical properties, first tubular holding fixture means secured to the finished side of said blank in predetermined alignment with the location on said blank of the ultimate optical center of the finished lens, a second tubular holding fixture means secured to the same side of said blank as said first fixture means in predetermined alignment with the location on said blank of the ultimate mechanical center of the finished lens, attachment means for so securing both of said fixture means to said blank, and index means formed in said assembly intermediate the fixture means in said attachment means in fixed relation to said second fixture means and in predetermined alignment with the orientation on said blank of the horizontal axis of the finished lens, said fixture means and index means being so constructed and arranged that said assembly can be accurately and operatively mounted during processing of the lens blank into a finished lens having the selected edge contour by referring to the optical center, mechanical center and horizontal alignment references.

19. An assembly for facilitating the forming of a prescribed optical surface on a lens blank and for shaping the blank into finished lens for mounting in a spectacle frame, comprising a semi-finished multi-focal lens blanks of material having known optical properties, first tubular holding fixture means mounted on the finished side of said blank in predetermined alignment with the location on said blank of the ultimate optical center of the finished lens, a second tubular holding fixture means secured to the same side of said blank as said first fixture means in predetermined alignment with the location on said blank of the ultimate mechanical center of the finished lens, each of said fixture means being positioned azimuthally with respect to the multifocal segment of said blank according to the prescribed cylinder axis, attachment means for so securing both of said fixture means to said blank, and index locator means secured to said blank intermediate the fixture means in said attachment means in predetermined alignment with the orientation on said blank of the cylinder axis and of the horizontal axis of the finished lens, said fixture means and index means being so constructed and arranged that said assembly can be accurately and operatively mounted during processing of the lens blanks into a finished lens having the selected edge contour by referring to the optical center, mechanical center and horizontal alignment references.

20. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, attaching index means to the finished surface of the semi-finished blank aligned with the ultimate mechanical center and the ultimate optical center respectively and referenced according to the ultimate horizontal alignment of the finished lens, forming the prescribed optical surface on the unfinished side of the lens blank relative to the ultimate optical center with reference to said index means, finishing the thus formed prescribed optical surface, and forming on the blank the final edge contour of the finished lens with respect to the mechanical center and the required horizontal alignment of the lens by employing the mechanical center and horizontal axis references derived from said index means.

21. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, attaching index means to the finished surface of the semi-finished blank aligned with the ultimate mechanical center and the ultimate optical center respectively and referenced according to the ultimate horizontal alignment of the finished lens, removing material from predetermined portions of the periphery of the blank to provide a smaller blank of essentially balanced condtion with respect to said ultimate mechanical center with reference to said index means, forming the prescribed optical surface on the unfinished side of the lens blank relative to the ultimate optical center with reference to said index means, finishing the thus formed prescribed optical surface, and forming on the blank the final edge contour of the finished lens with respect to the mechanical center and the required horizontal alignment of the lens with reference to said index means by employing the mechanical center and horizontal axis references derived from said index means.

22. A method of producing an ophthalmic lens according to prescribed dimensional relations, comprising the steps of supporting a semi-finished lens blank in a predetermined position, determining the location of the ultimate mechanical center of the finished lens and of the ultimate optical center of the finished lens on said blank in such position, positioning index means on the finished surface of the semi-finished blank aligned with the ultimate mechanical center and the ultimate optical center, orienting said index means relative to said blank in accordance with the prescribed cylinder axis for the finished lens, then securing said index means to the finished surface of the semi-finished blank, forming the prescribed optical surface on the unfinished side of the lens blank relative to the ultimate optical center with reference to said index means, finishing the thus formed optical surface, and forming on the blank the final edge contour of the finished lens with respect to the mechanical center and cylinder axis with reference to said index means by employing the mechanical center and horizontal axis references derived from said index means.

23. Apparatus for use in forming a prescribed optical surface on a lens blank, comprising a blank holder for supporting said blank in a predetermined location, first means adjustable with respect to said blank holder for alignment with the ultimate mechanical center of the finished lens, second means adjustable with respect to said blank holder for movement into alignment with the ultimate optical center of the finished lens, third means for providing a reference relative to the location on the blank of the ultimate horizontal axis of the finished lens, and means cooperating with said first, second and third means for interposing an attachment secured to the lens blank to fix the location of the ultimate mechanical center and ultimate optical center references on the blank and to provide an index means on said blank in accordance with the alignment produced by said first and second means and for forming a reference locator in said attachment of the reference provided by said third means.

24. The invention in accordance with claim 23 wherein means are provided for adjusting said first means with respect to the blank holder for alignment with the ultimate mechanical center of the finished lens, means are provided for adjusting said second means with respect to said blank holder for alignment with the ultimate optical center of the finished lens, and means for shifting each of said first, and second means a predetermined amount relative to said blank according to the prescribed cylinder axis orientation.

References Cited by the Examiner

UNITED STATES PATENTS

| 2,275,476 | 3/1942 | Sherman et al. | 83—648 |
| 2,278,314 | 3/1942 | Houchin | 51—124 |
| 2,457,864 | 1/1949 | Burn | 83—648 |
| 2,747,339 | 5/1956 | Schelling | 51—124 |
| 2,994,166 | 8/1961 | Bardwell et al. | 61—284 |
| 3,015,196 | 1/1962 | Campbell | 51—284 |
| 3,049,766 | 8/1962 | Buckminster. | |

ROBERT C. RIORDON, *Primary Examiner.*

LESTER M. SWINGLE, FRANK E. BAILEY,
*Examiners.*